(12) United States Patent
Grocutt

(10) Patent No.: US 11,354,404 B2
(45) Date of Patent: Jun. 7, 2022

(54) TRANSITION DISABLE INDICATOR

(71) Applicant: Arm Limited, Cambridge (GB)

(72) Inventor: Thomas Christopher Grocutt, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/266,855

(22) PCT Filed: Aug. 22, 2019

(86) PCT No.: PCT/GB2019/052363
§ 371 (c)(1),
(2) Date: Feb. 8, 2021

(87) PCT Pub. No.: WO2020/074853
PCT Pub. Date: Apr. 16, 2020

(65) Prior Publication Data
US 2021/0294924 A1 Sep. 23, 2021

(30) Foreign Application Priority Data
Oct. 8, 2018 (GB) ..................... 1816354

(51) Int. Cl.
*G06F 21/54* (2013.01)
*G06F 9/30* (2018.01)
(Continued)

(52) U.S. Cl.
CPC .......... *G06F 21/54* (2013.01); *G06F 9/30101* (2013.01); *G06F 9/3861* (2013.01);
(Continued)

(58) Field of Classification Search
USPC ........................................................ 726/26
See application file for complete search history.

(56) References Cited

U.S. PATENT DOCUMENTS

2009/0293129 A1* 11/2009 Henry ..................... G06F 21/73
726/26
2013/0205125 A1 8/2013 Grocutt
(Continued)

FOREIGN PATENT DOCUMENTS

GB 2527643 12/2015
WO 2004/046916 6/2004
(Continued)

OTHER PUBLICATIONS

International Search Report for PCT/GB2019/052363 dated Oct. 17, 2019, 4 pages.
(Continued)

*Primary Examiner* — Sakinah White Taylor
(74) *Attorney, Agent, or Firm* — Nixon & Vanderhye P.C.

(57) ABSTRACT

An apparatus has processing circuitry 4 supporting a number of security domains, and within each domain supporting a number of modes including a handler mode for exception processing and a thread mode for background processing. For an exception entry transition from secure thread mode to secure handler mode, a transition disable indicator 42 is set. For at least one type of exception return transition to processing in the secure domain and the thread mode when the transition disable indicator 42 is set, a fault is signaled. This can protect against some security attacks.

18 Claims, 10 Drawing Sheets

(51) Int. Cl.
　　*G06F 9/38*　　　(2018.01)
　　*G06F 21/55*　　(2013.01)
　　*G06F 21/64*　　(2013.01)
　　*G06F 21/74*　　(2013.01)

(52) U.S. Cl.
　　CPC .......... *G06F 21/554* (2013.01); *G06F 21/556* (2013.01); *G06F 21/64* (2013.01); *G06F 21/74* (2013.01)

(56) References Cited

U.S. PATENT DOCUMENTS

2013/0339629 A1* 12/2013 Alexander .......... G06F 9/30087
　　　　　　　　　　　　　　　　　　　　711/144
2014/0075581 A1　　3/2014 Grocutt et al.

FOREIGN PATENT DOCUMENTS

| WO | 2013/117896 | 8/2013 |
| WO | 2013/117899 | 8/2013 |
| WO | 2014/053803 | 4/2014 |

OTHER PUBLICATIONS

Written Opinion of the ISA for PCT/GB2019/052363 dated Oct. 17, 2019, 7 pages.
Search Report for GB 1816354.3 dated Apr. 3, 2019, 4 pages.

* cited by examiner

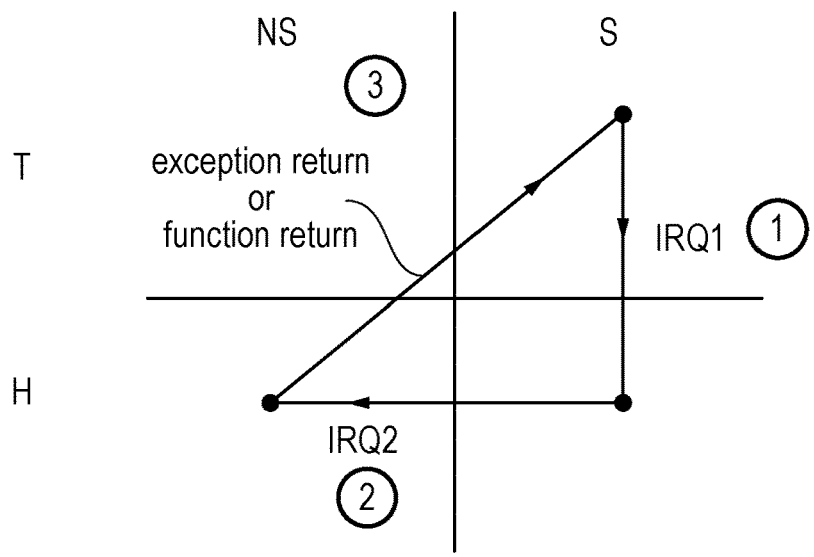
FIG. 6
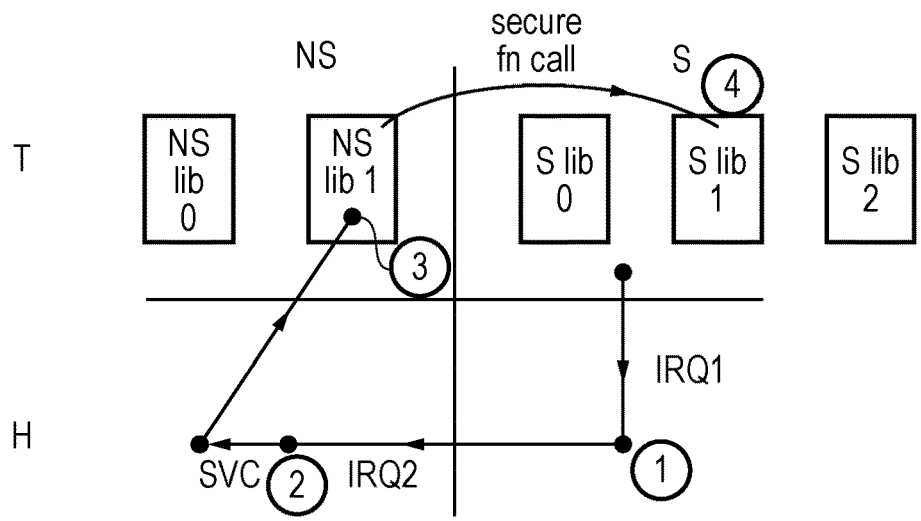
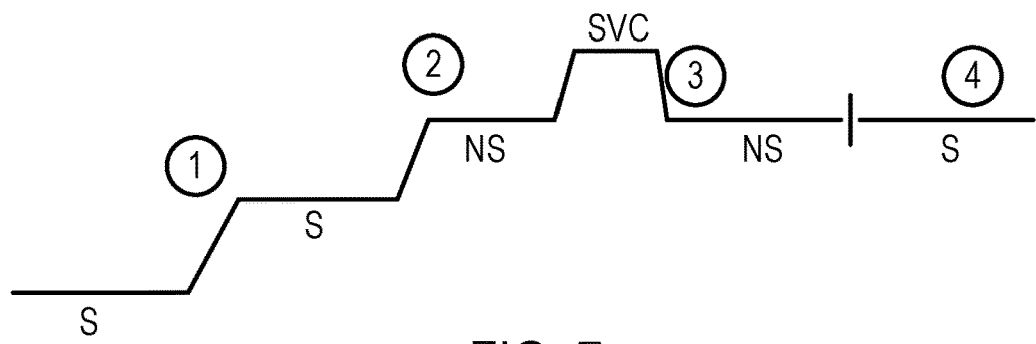
FIG. 7

Exception entry

| background stack | background security domain | background mode | exception target security domain | stack frame format | PSP_S disable indicator 42 |
|---|---|---|---|---|---|
| 1 Main stack pointer | Secure | Thread | Secure | caller regs and possibly callee regs | no change |
| 2 Main stack pointer | Secure | Thread | less-secure | caller and callee saved regs | no change |
| 3 Main stack pointer | Secure | Handler | Secure | caller regs and possibly callee regs | no change |
| 4 Main stack pointer | Secure | Handler | less-secure | caller and callee saved regs | no change |
| 5 Main stack pointer | less-secure | Thread | Secure | caller saved regs only | no change |
| 6 Main stack pointer | less-secure | Thread | less-secure | caller saved regs only | no change |
| 7 Main stack pointer | less-secure | Handler | Secure | caller saved regs only | no change |
| 8 Main stack pointer | less-secure | Handler | less-secure | caller saved regs only | no change |
| 9 Process stack pointer | Secure | Thread | Secure | caller regs and possibly callee regs | disable indicator set if only caller regs saved |
| 10 Process stack pointer | Secure | Thread | less-secure | caller and callee saved regs | no change |
| 11 Process stack pointer | less-secure | Thread | Secure | caller saved regs only | no change |
| 12 Process stack pointer | less-secure | Thread | less-secure | caller saved regs only | no change |

FIG. 8

Exception return

| | Security domain associated with exception | Security domain when exception return requested | Stack pointer being returned to | mode being returned to | security domain being returned to | Callee regs expected & integrity signature checked | PSP_S disable indicator 42 |
|---|---|---|---|---|---|---|---|
| 1 | Secure | Secure | Main stack pointer | Thread | Secure | depends on EXC_RETURN.DCRS flag | no action |
| 2 | Secure | Secure | Main stack pointer | Thread | less-secure | no | no action |
| 3 | Secure | Secure | Main stack pointer | Handler | Secure | depends on EXC_RETURN.DCRS flag | no action |
| 4 | Secure | Secure | Main stack pointer | Handler | less-secure | no | no action |
| 5 | Secure | Secure | Process stack pointer | Thread | Secure | depends on EXC_RETURN.DCRS flag | disable indicator cleared |
| 6 | Secure | Secure | Process stack pointer | Thread | less-secure | no | no action |
| 7 | less-secure | Secure | Main stack pointer | Thread | Secure | yes | no action |
| 8 | less-secure | Secure | Main stack pointer | Thread | less-secure | no | no action |
| 9 | less-secure | Secure | Main stack pointer | Handler | Secure | yes | no action |
| 10 | less-secure | Secure | Main stack pointer | Handler | less-secure | no | no action |
| 11 | less-secure | Secure | Process stack pointer | Thread | Secure | yes | fault raised if disable indicator set |
| 12 | less-secure | Secure | Process stack pointer | Thread | less-secure | no | no action |
| 13 | less-secure | less-secure | Main stack pointer | Thread | Secure | yes | no action |
| 14 | less-secure | less-secure | Main stack pointer | Thread | less-secure | no | no action |
| 15 | less-secure | less-secure | Main stack pointer | Handler | Secure | yes | no action |
| 16 | less-secure | less-secure | Main stack pointer | Handler | less-secure | no | no action |
| 17 | less-secure | less-secure | Process stack pointer | Thread | Secure | yes | fault raised if disable indicator set |
| 18 | less-secure | less-secure | Process stack pointer | Thread | less-secure | no | no action |

TRANSITION DISABLE INDICATOR

CROSS-REFERENCE TO RELATED APPLICATIONS

This application is the U.S. national phase of International Application No. PCT/GB2019/052363 filed Aug. 22, 2019 which designated the U.S. and claims priority to GB 1816354.3 filed Oct. 8, 2018, the entire contents of each of which are hereby incorporated by reference.

The present technique relates to the field of data processing.

Processing circuitry may support performing data processing in one of a number of security domains, including at least a secure domain and a less secure domain. This can allow sensitive data or code associated with the secure domain to be protected from inappropriate access by less secure code operating in the less secure domain.

At least some examples provide an apparatus comprising: processing circuitry to perform data processing in one of a plurality of security domains including at least a secure domain and a less secure domain, and within a given security domain, to perform data processing in one of a plurality of modes, including a handler mode for exception processing and a thread mode for background processing; memory access checking circuitry to check whether a memory access is allowed depending on a current security domain of the processing circuitry; and exception control circuitry responsive to an exception condition to perform one of a plurality of exception entry transitions selected based on a current mode and the current security domain of the processing circuitry, and a security domain associated with the exception condition, the plurality of exception entry transitions including at least one secure thread mode to secure handler mode exception entry transition; in which: the exception control circuitry is responsive to an exception return condition to perform one of a plurality of exception return transitions selected based on the mode and security domain associated with the exception return condition; in response to the at least one secure thread mode to secure handler mode exception entry transition the exception control circuitry is configured to set a transition disable indicator; and for at least one type of exception return transition to processing in the secure domain and the thread mode when the transition disable indicator is set, the exception control circuitry is configured to trigger signaling of a fault.

At least some examples provide a data processing method for processing circuitry capable of performing data processing in one of a plurality of security domains including at least a secure domain and a less secure domain, for which checking of whether memory accesses are allowed is dependent on a current security domain of the processing circuitry, and within a given security domain, the processing circuitry is capable of performing data processing in one of a plurality of modes, including a handler mode for exception processing and a thread mode for background processing; the method comprising: in response to an exception condition, performing one of a plurality of exception entry transitions selected based on a current mode and a current security domain of the processing circuitry, and a security domain associated with the exception condition, the plurality of exception entry transitions including at least one secure thread mode to secure handler mode exception entry transition; and in response to an exception return condition, performing one of a plurality of exception return transitions selected based on the mode and security domain associated with the exception return condition; in which: in response to the at least one secure thread mode to secure handler mode exception entry transition, a transition disable indicator is set; and for at least one type of exception return transition to processing in the secure domain and the thread mode when the transition disable indicator is set, a fault is signaled.

At least some examples provide a computer program for controlling a host data processing apparatus to provide an instruction execution environment for execution of instructions; the computer program comprising: processing program logic to support data processing in one of a plurality of security domains including at least a secure domain and a less secure domain, and within a given security domain, to support data processing in one of a plurality of modes, including a handler mode for exception processing and a thread mode for background processing; memory access checking program logic to check whether a memory access is allowed depending on a current security domain of the processing program logic; and exception control program logic responsive to an exception condition to perform one of a plurality of exception entry transitions selected based on a current mode and a current security domain of the processing program logic, and a security domain associated with the exception condition, the plurality of exception entry transitions including at least one secure thread mode to secure handler mode exception entry transition; in which: the exception control program logic is responsive to an exception return condition to perform one of a plurality of exception return transitions selected based on the mode and security domain associated with the exception return condition; in response to the at least one secure thread mode to secure handler mode exception entry transition the exception control program logic is configured to set a transition disable indicator; and for at least one type of exception return transition to processing in the secure domain and the thread mode when the transition disable indicator is set, the exception control program logic is configured to trigger signaling of a fault.

The computer program may be stored on a computer-readable storage medium. The storage medium may be non-transitory storage medium.

Further aspects, features and advantages of the present technique will be apparent from the following description of examples, which is to be read in conjunction with the accompanying drawings, in which:

FIG. 1 schematically illustrates an example of a data processing system having processing circuitry supporting secure and less secure domains;

FIG. 6 illustrates an inappropriate sequence of exception entry and return transitions which can be detected using the transition disable indicator described below;

FIG. 7 shows an example use case of calling from a less secure library to a secure library;

FIG. 8 is a table illustrating different exception entry transitions supported by the data processing apparatus;

FIG. 9 is a table showing a number of different exception return transitions supported by the data processing apparatus;

Figure 1:
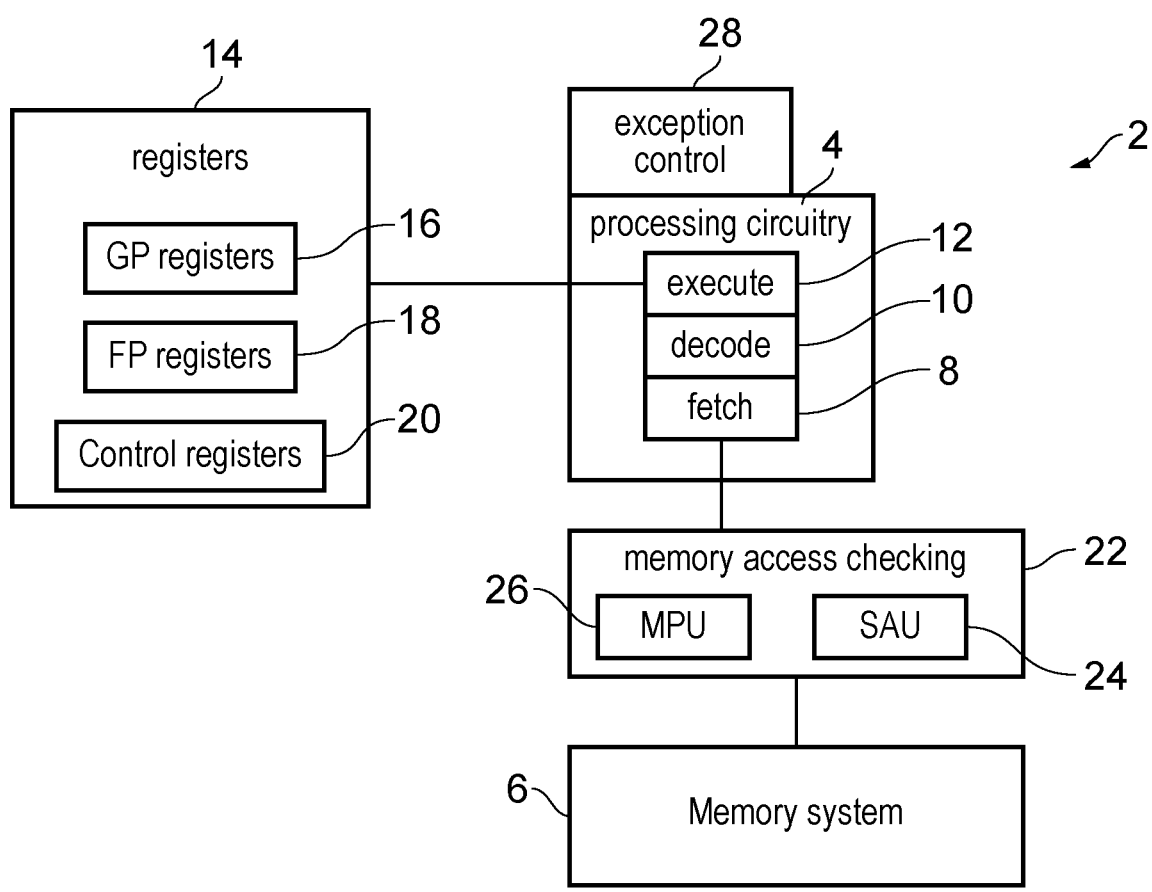

The processing circuitry may support performing data processing in one of a number of security domains including at least a secure domain and a less secure domain. Memory access checking circuitry may be provided to check whether memory accesses are allowed depending on a current security domain of the processing circuitry. In addition, within a given security domain, the processing circuitry may support data processing in one of a plurality of modes, including a handler mode for exception processing and a thread mode for background processing. Control over access to regions of memory, and of which architectural registers are accessible to the processing circuitry, may be based on a combination of the current security domain and the current mode of the processing circuitry (in some cases such control of access to memory or registers may also depend on other control parameters of the architecture).

Exception control circuitry may be provided which, in response to an exception condition, performs one of a number of exception entry transitions selected based on a current mode and current security domain of the processing circuitry and a security domain associated with the exception condition. The exception control circuitry may also be responsive to an exception return condition to perform one of a number of exception return transitions selected based on the mode and security domain associated with the exception return condition. The actions performed for a particular exception entry transition, or a particular exception return transition, may vary depending on the particular transition selected. For example, certain exception entry/return transitions could include some security checks which may not be needed for other transitions.

In the technique discussed below, in response to at least one secure thread mode to secure handler mode exception entry transition, the exception control circuitry may set a transition disable indicator. For at least one type of exception return transition to processing in the secure domain and the thread mode when the transition disable indicator is set, the exception control circuitry may trigger signaling of a fault. These measures provide a mitigation against a potential attack which could otherwise seek to use an inappropriate sequence of exception entry and return transitions to avoid certain security checks. By providing the transition disable indicator which can temporarily disable certain types of exception return transition, this can provide a more secure system which is less vulnerable to attack.

The at least one secure thread mode to secure handler mode exception entry transition (for which the transition disable indicator is set) may be a transition for which at least one protective action is omitted. In contrast, such a protective action may be performed for at least one secure thread mode to less secure handler mode exception entry transition (the protective measure may be needed here because there may be greater risk associated with transitioning to less secure handler code than secure handler code). The protective action could, for example, include putting in place measures for guarding against the possibility of an attacker later triggering an inappropriate sequence of exception entry and return transitions. Omitting the protective measure when transitioning to secure handler mode from secure thread mode may help to improve performance.

However, if this protective action is omitted for the at least one secure thread mode to secure handler mode exception entry transition, then if the attacker later triggers an inappropriate return to the secure domain and thread mode with the protective action previously having been omitted, then such an inappropriate return may not be detected. For example the protective action could be the storing of an integrity signature as discussed below which can be subject to integrity checking on the corresponding return.

By setting the transition disable indicator in response to at least one secure thread mode to secure handler mode, then this can flag that the protective measure was not performed, and if the transition disable indicator is still set when the at least one type of exception return transitioning to processing in the secure domain and the thread mode is encountered then a fault can be triggered to prevent an attack exploiting a potentially mismatching sequence of exception entry and returns.

The at least one type of exception return transition to processing in the secure domain and the thread mode (for which a fault may be triggered if the transition disable indicator is set) may comprise at least one of: a transition from processing in the less secure domain and the handler mode to processing in the secure domain and the thread mode; and a transition from processing in the secure domain and the handler mode to processing in the secure domain and the thread mode, when the exception return transition is associated with exception return information specifying that the exception return transition corresponds to a previous exception entry condition to the less secure domain and the handler mode (e.g. an exception entry from secure domain and handler mode to the less secure domain and the handler mode). The exception return transition could be associated with exception return information specifying that the exception return transition corresponds to a previous exception entry condition to the less secure domain and the handler mode for a number of reasons, e.g. because the exception return information was set when such a previous exception entry condition actually occurred, or because an attacker has faked the exception return information to indicate that such a previous exception entry condition occurred, even if the previous exception entry condition had not occurred. The types of exception return transitions mentioned above may be associated with greater risk than other types of exception return transitions, and so it might be expected that the at least one protective action was previously performed on the corresponding exception entry transition (which for these particular exception return transitions might be expected to have been an exception entry transition from the secure domain to less secure handler mode). However, if the corresponding exception entry was actually the at least one secure thread mode to secure handler mode exception entry transition (e.g. due to the attacker faking a different type of exception return transition to the one expected) then the lack of the protective action performed on the corresponding exception entry transition could potentially affect security. This is mitigated against by providing the transition disable indicator and checking whether the transition disable indicator is set when encountering the at least one type of exception return transition to processing in the secure domain and the thread mode.

The apparatus may have at least one stack pointer register to store at least one stack pointer for pointing to a corresponding stack data structure in the memory system. Different stack data structures could be provided, each stack associated with different combinations of the security domain and the mode of operation. For example, the at least one stack pointer may include a secure process stack pointer associated with a secure process stack data structure, where the secure process stack pointer is accessible to the processing circuitry when in a combination of the secure domain and the thread mode. Such stack data structures can be used in response to exception entry transitions for saving at least a subset of architectural state data from registers to a stack data structure identified by an active stack pointer. The active stack pointer may be selected based on the current mode and security domain, and optionally could (at least for some exception entry transitions) also depend on a stack pointer selection value stored in a control register. On exception return transitions, a selected stack pointer may be used to identify the stack from which corresponding architectural state is to be restored to registers. Again, the selected stack pointer may be selected based on properties of the exception return transition (e.g. the mode and domain to which the return is being made) and optionally also based on the stack pointer selection value for certain transitions. The provision of different stack pointers accessible in different combinations of mode and domain can be useful for ensuring that data provided on a stack associated with one combination of mode and domain is not visible to another combination of mode and domain.

The set of data that is saved onto one of the stack data structures in response to an exception condition may be referred to as a stack frame. The system may support different versions of the stack frame for different exception entry transitions. For example the exception control circuitry may respond to the exception condition by saving at least a subset of architectural state data from registers to the relevant stack data structure so that that stack data structure is provided with one of a first exception stack frame and a second exception stack frame, where the second exception stack frame may comprise a subset of architectural state data from the registers that is omitted from the first exception stack frame.

It can be useful to provide different versions of the exception stack frame so as to enable a balance between security and performance. In general, saving a greater amount of state data from the registers to the stack data structure in memory will require more time and hence increase exception handling latency. Therefore, in exception entry transitions where there are lower security requirements, such as the at least one secure thread to secure handler exception entry transition, the smaller first exception stack frame may be saved. If the exception handler software needs to update one of the registers which was not included in the first exception stack frame, then the software of the exception handler itself may be responsible for triggering saving of the remaining architectural state which was omitted from the first exception stack frame. This approach of dividing the architectural state into two subsets (a "caller" set of architectural state which the hardware automatically saves in the first exception stack frame and a "callee" set of architectural state which it is the responsibility of the software of the exception handler to save if necessary) can provide improved interrupt handling latency compared to either the case where the hardware saves all the architectural state or the case where the software is completely responsible for all the state saving (allowing the software to have responsibility for saving some registers can be beneficial for latency because it means the software can choose not to save certain registers if they will not actually be used or modified by the exception handler).

However, on certain exception entry transitions (e.g. transitions from secure domain to less secure domain), it may not be appropriate to allow the exception handler to perform the state saving of the additional callee state in software, as this could allow the less secure exception handler access to potentially sensitive data left in the registers by secure code executing before the exception occurred. Therefore, for certain exception entry transitions the hardware of the exception control circuitry may instead save a second exception stack frame which includes not only the data from the first exception stack frame, but also an additional subset of architectural state data. Where additional state saving of the second exception stack frame is performed, the hardware of the exception control circuitry may also trigger clearing of the registers to a value uncorrelated with their previous contents. Hence, the exception control circuitry which supports hardware triggered saving of either a first stack frame (faster interrupt handling latency) or a second stack frame (increased security) can provide a better balance between latency and security than if there was a fixed allocation of which registers are saved in hardware or software for all types of exception entry transition.

The second exception stack frame may include an integrity signature that is omitted from the first exception stack frame. For a subset of exception return transitions, the exception control circuitry may perform integrity signature checking, which comprises accessing a stack frame from a given stack data structure selected for that exception return transition, and triggering a fault when a mismatch is detected between the value at a predetermined position in the unstacked stack frame and the integrity signature. Such integrity signature checking can be useful for example for guarding against certain attacks where a function return is faked by the attacker when in fact the expected return mechanism was an exception return transition, or where an exception return is triggered by the attacker when actually a function return was expected. Such mismatching of exception and function entries and returns could otherwise potentially circumvent certain security measures or could risk indeterminate behaviour due to restoration of state to registers from a mismatching stack frame. The provision of an integrity signature which is stored in a stack frame on certain exception entry transitions and can be checked on the corresponding exception return transitions can enable such mismatching entry and returns to be detected.

However, in cases where the first exception stack frame saved by the hardware does not include the integrity signature, then such protective measures are not performed. This may be acceptable when the exception entry transition is from secure thread mode to secure handler mode, since the expected return transition would then be back from secure handler mode to secure thread mode, and so would not require the integrity signature checking. However, the provision of the transition disable indicator discussed above means that if the attacker does manage to fake an exception return from less secure handler mode to secure thread mode (or from secure handler mode where the previous exception entry condition was from secure handler mode to less secure handler mode), then although the stack frame may lack the integrity signature, the attack can still be detected because of the transition disable indicator being set, so that a fault can be triggered and the inappropriate exception return can be prevented. Hence, this improves security.

For a given exception return condition, the corresponding exception entry condition may be the particular exception entry condition which caused the current stack frame (from which the given exception return condition would attempts to restore architectural state) to be saved to the stack data structure.

The at least one secure thread mode to secure handler mode exception entry transition, for which the transition disable indicator is set, may comprise an exception entry transition from the secure domain and the thread mode to the secure domain and the handler mode for which the first exception stack frame is provided on the secure process stack data structure. In cases where the second exception stack frame is provided on the secure process stack data structure, then it is not necessary to set the condition disable indicator because in this case then the integrity signature would be present on the stack frame to provide the appropriate protection.

The transition disable indicator may be cleared in response to various events. For example, the exception control circuitry may clear the transition disable indicator in response to an exception return transition to processing in the secure domain and the thread mode for which integrity signature checking is not performed and unstacking is performed using the secure process stack pointer. Such an exception return transition may be the expected exception return transition which should follow corresponding to the original exception entry transition for which the first exception stack frame was provided on the secure process stack data structure in response to a transition from secure thread mode to secure handler mode, and so once the expected exception return has been performed then the attack described above is no longer a risk and the transition disable indicator can be cleared so as to reduce the chances of faults in future.

The exception control circuitry could also clear the transition disable indicator when the first exception stack frame stored on the secure process stack data structure is upgraded to provide the second exception stack frame on the secure process stack data structure. For example, in some cases the exception control circuitry may tail-chain exceptions or may preempt lower priority exceptions to handle higher priority exceptions (if the original lower priority exception handler has not yet started when the higher priority exception is taken). If the exception control circuitry, in response to an initial exception condition triggering the at least one secure thread mode to secure handler mode exception entry transition, initially saves only the first exception stack frame to the secure process stack data structure, but then before starting to handle the corresponding exception handler a higher priority exception is encountered which indicates a transition to the less secure domain, then the additional architectural state which was omitted from the first exception stack frame may need to be saved to the secure process stack data structure to upgrade the first exception stack frame to the second exception stack frame. At this point, the integrity signature will now be present on the stack and so the secure process stack data structure is protected against possible attacks so that it is no longer necessary to set the transition disable indicator. Hence at this point the transition disable indicator can be cleared.

The at least one type of exception return transition to processing in the secure domain and the thread mode, for which a fault is triggered if the transition disable indicator is set, may be an exception return transition for which architectural state is to be restored from the secure process stack data structure and for which the integrity signature checking is to be performed. For such an exception return transition, if the transition disable indicator is set then this means that the corresponding stack frame on the secure process stack data structure may lack the integrity signature so that this may risk the integrity signature checking reading an arbitrary value from a memory location outside the stack frame. This could allow an attacker to pose an attack by manipulating the value at the arbitrary location in memory to match the integrity signature in an attempt to cause the integrity checking to pass despite the stack frame being of the wrong format, so that subsequent misinterpretation of the stack frame could lead to indeterminate and potentially insecure behaviour which could be exploited by an attacker. The provision of the transition disable indicator to trigger a fault on this type of exception return transition helps to eliminate this attack.

The transition disable indicator could be represented in different ways. In general the transition disable indicator may be any configuration parameter which may be stored in a control register of the processing circuitry.

However, in one example the transition disable indicator may be a secure process stack disable indicator which, when set, indicates that access to the secure process stack pointer is disabled. Hence, if the processing circuitry attempts to access the register providing the secure process stack pointer, this may trigger a fault if the secure process stack disable indicator is set. The transition disable indicator could be stored in a range of different control registers. In some cases a dedicated register could be provided for storing the transition disable indicator, or spare bits within an already provided register could be used.

In one example, the apparatus may include a secure process stack pointer limit register to store a secure process stack pointer limit value. In response to detecting one of: (i) the secure process stack data structure extending beyond the secure process stack pointer limit value, and (ii) an attempt to adjust the secure process stack pointer register to a value beyond the secure process stack pointer limit value, the exception control circuitry may trigger signaling of a fault. The provision of a limit on the extent to which the secure process stack can grow can be useful for protecting potentially sensitive data in some regions of the address space from being overwritten if the secure process stack grows too much. If the limit is exceeded, the exact timing at which the fault is triggered could vary—the check for determining whether the limit has been exceeded can be performed at different points. For example, the check could be performed when pushing data to the stack or popping data from the stack, or when adjusting the secure process stack pointer (even if no data is currently being saved to or restored from the stack).

In some examples the transition disable indicator may be stored in the secure process stack pointer limit register. This can be useful because address alignment rules may mean that in practice the least significant portion of the address placed in the secure process stack pointer limit register may be effectively unused, with some least significant bits always being 0. Such spare bits could be reused to encode the transition disable indicator, so that there is no need to provide additional register storage capacity to accommodate the transition disable indicator.

Another option may be to encode the transition disable indicator within the secure process stack pointer register itself. Again, address alignment rules may require the stack pointer to be aligned to a certain address boundary which may leave some bits of the address at the least significant end of the address equal to 0, and these could be reused to provide the transition disable indicator.

An advantage of using the secure process stack pointer limit register, rather than the secure process stack pointer register, to encode the transition disable indicator is that it is less likely that the secure process stack pointer limit value may be used as an index into various data structures (in contrast the stack pointer itself may be used as an index), and so using the limit register can avoid the added complexity of providing additional program instructions for masking out the bits used to encode the transition disable indicator when the stack pointer is used as an index. Nevertheless, it would still be possible to encode the transition disable indicator in the secure process stack pointer register if desired, or to provide a different register for storing the transition disable indicator. The secure process stack pointer register and the secure process stack pointer limit registers may already be saved and restored when context switching between threads, so placing the transition disable indicator in one of the unused bits in these registers has the advantage that no additional saving and restoring is required on a context switch.

The transition disable indicator need not always be set in response to the at least one secure thread mode to secure handler mode exception entry transition. In some implementations, whether the transition disable indicator is set in response to this exception entry transition may depend on a configuration indicator stored in a configuration register. When the configuration indicator has a first value then the at least one secure thread mode to secure handler mode exception entry transition may trigger the setting of the transition disable indicator. When the configuration indicator has a second value then setting of the transition disable indicator may be omitted. This can be useful for ensuring compatibility with a legacy architecture which did not have support for the transition disable indicator.

More particularly, the at least one stack pointer register may include a secure process stack pointer associated with a secure process stack data structure as discussed above, as well as at least one main stack pointer associated with at least one main stack data structure for storing architectural state data saved in response to an exception entry transition from processing in the handler mode. The use of separate main and process stacks can be useful so that state left by exception handlers on the main stack does not become visible to threads executing in the thread mode after an exception return, which simplifies development of the exception handler code as it means that the exception handler code does not need not be as careful in removing its data from the main stack before returning to previous processing.

In a legacy architecture, the security issue associated with the mismatching exception entry and return events as discussed above could be addressed instead by, in response to the at least one secure thread mode to secure handler mode exception entry transition, updating a stack selection value to indicate that one of the at least one main stack data structure should be used for unstacking architectural state data in response to a subsequent exception return transition to processing in the thread mode. By forcing the unstacking on return to the thread mode to use the main stack instead of the secure process stack this may cause other integrity checks to fail when the attack is mounted so that the attack can be detected.

An advantage of using the transition disable indicator as discussed above is that it is not necessary to force processes operating in the thread mode to use the main stack data structure in response to certain exception return events, which means that for some secure libraries executing in the thread mode and the secure domain, the library may sometimes need to use the main stack data structure and other times need to use the process stack data structure, which can be harder to manage. With the use of the transition disable indicator it is no longer necessary to update a stack selection value to switch the thread mode to use in the main stack data structure, so that the secure libraries can consistently use the process stack, which can simplify management of software libraries in the secure domain.

However, for compatibility with legacy code (which may rely on the fact that the stack selection value has been updated) the configuration indicator may be provided so that when the configuration indicator has the second value then the stack selection value may be updated as in the legacy architecture, while if the configuration indicator has the first value then the transition disable indicator can be set as discussed above. This ensures that both new and legacy code can operate as intended.

In addition to the at least one type of exception return condition discussed above, for at least one other type of event the exception control circuitry may, when the transition disable indicator is set, trigger signaling of a fault. For example, when the transition disable indicator is set, any one or more of the following events may also trigger signaling of a fault:

a function call from processing in the less secure domain to processing in the secure domain and the thread mode. This can help protect against an attacker who may try to use a function call instead of an expected exception return transition to trigger unstacking of a mismatching stack frame.

a function return from processing in the less secure domain to processing in the secure domain and the thread mode. This can help protect against an attacker who may try to use a function return instead of the expected exception return transition to trigger unstacking of a mismatching stack frame.

processing of any instruction in the secure domain and the thread mode. Although it may be that only certain events are a risk, some implementations may instead simply trigger a fault if any instruction is executed in the secure domain and thread mode when the transition disable indicator is set, rather than providing specific circuit logic for detecting those events that may pose a risk.

a secure gateway data processing instruction that indicates a valid entry point to the secure domain, when processed in the thread mode and associated with a transition from the less secure domain to the secure domain. Some architectures may require that function calls to the secure domain trigger a fault if the first instruction executed after the function call is an instruction other than a secure gateway data processing instruction. The secure gateway data processing instruction itself can control the instruction decoder to trigger security checking hardware to perform various checks. Hence, the checking of the transition disable indicator could be included as part of the checks performed for the secure gateway data processing instruction.

a first access, following a transition to a combination of the secure domain and the thread mode, to a secure process stack pointer accessible to the processing circuitry when in a combination of the secure domain and the thread mode.

A given architecture implementation may support any one or more of these options. By triggering faults in these scenarios this can also protect against other potential attacks such as the attacker using a function return to secure thread mode from non-secure thread mode or a function call from less secure thread mode to secure thread mode, to enable detection of cases when a previous exception entry transition had not saved the integrity signature to the relevant stack frame.

A corresponding computer program may be provided for controlling a host data processing apparatus to provide an instruction execution environment for execution of instructions. The computer program may comprise processing program logic, memory access checking program logic and exception control program logic, which corresponds in functionality to the processing circuitry, memory access checking circuitry and exception control circuitry discussed above. Such a simulator computer program may present, to software executing on the simulator computer program, a similar instruction environment to that which would be provided by an actual hardware apparatus, even though there may not be any actual hardware providing these features in the host computer which is executing the simulator computer program. The functionality of the hardware architecture discussed above may be emulated by providing program logic, such as sets of instructions or data structures, which enables a generic host computer to execute code intended for execution on an apparatus with the exception handling support discussed above, in a manner compatible with the results that would be achieved on an apparatus which actually has the exception control circuitry discussed above provided in hardware. The simulator computer program for controlling the host data processing apparatus may be stored on a storage medium. This storage medium may be a non-transitory storage medium.

FIG. 1 schematically illustrates an example of a data processing system 2 including processing circuitry 4 for performing data processing in response to instructions fetched from a memory system 6. The memory system 6 may include caches (e.g. one or more levels of data caches and/or instruction caches) as well as main memory. The processing circuitry 4 includes a processing pipeline including a number of pipeline stages including, for example, a fetch stage 8 for fetching the instructions to be executed from the memory system 6, a decode stage 10 for decoding the fetched instructions to generate control signals for controlling the remaining pipeline stages to perform the data processing, and an execute stage 12 for executing the decoded instructions to perform data processing operations. Registers 14 are provided for storing input operands for the instructions processed by the pipeline 4. The registers 14 include a number of types of registers including general purpose (integer) registers 16 for storing integer values, floating point registers 18 for storing floating point values and control registers 20 for storing control parameters for controlling the execution of instructions by the processing circuitry 4 and other operations such as exception handling, security checking, etc.

It will be appreciated that the pipeline stages shown in FIG. 1 are a simplified representation, and other types of pipeline stages could also be provided, such as a rename stage for performing register renaming, an issue stage for queuing instructions awaiting execution and issuing them for execution when their required operands are available, and a write back stage for handling commitment of instructions and writing back results to the registers 14. The pipeline could be an in order or out of order pipeline.

The system 2 also includes memory access checking circuitry 22 for checking whether accesses to the memory system 6 are permitted based on attribute data specified for various regions of a memory address space. The memory access checking circuitry includes a security attribute unit (SAU) 24 for storing security domain defining data which defines a security domain associated with each respective region of the memory address space. Based on the security attribute data, the security attribute unit 24 may check whether a memory access is allowed depending on a current security domain of operation of the processing circuitry and on the security domain associated with the region including the target address of the memory access. In other embodiments the SAU may not directly store the security domain defining data, but instead access security domain defining data stored elsewhere in order to perform the memory access checks. In some systems the security domain defining data may be stored in the memory system 6, or may be configuration registers elsewhere in the system 2. The processing circuitry 4 may operate in a current security domain of operation, which may generally correspond to the security domain associated with the address of the instruction currently being executed (although there may be some exceptions, e.g. when handling transitions between domains). When an instruction branches from an address in a region specified by the SAU 24 as being in one domain to an address in a region associated with a different domain, this may trigger a transition of the current security domain in which the processing circuitry 4 is operating. In general, while operating in a secure domain, the processing circuitry may have access to data in memory regions associated with both the secure domain and a less secure domain, while when operating in the less secure domain the processing circuitry may have access to the data in regions associated with the less secure domain but may not be permitted to access data in regions of the address space which the SAU 24 specifies as being associated with the secure domain. This enables protection of sensitive data against unauthorised access from code operating in the less secure domain.

Also, the memory access checking circuitry may include a memory protection unit 26 which checks whether memory accesses to the memory system 6 satisfy access permissions which may specify, for example, which privilege levels of the processing circuitry 4 are allowed to access a given region of memory, or may specify whether a memory region of the address space can be accessed by both read and write operations or is a read only region for which writes are prohibited. The access permissions used by the MPU 26 may for example be specified by a more privileged process (such as a hypervisor or an operating system) to control which regions of memory a less privileged process (such as an application is allowed to access), and how (read only or read/write). The permissions provided by the MPU 26 may be orthogonal to those provided by the SAU 24, so that for a given memory access to be allowed, it should pass the checks based on the access permissions defined for both the MPU 26 and the SAU 24. Although the MPU 26 is shown as a single entity in FIG. 1, in some examples separate secure and less secure MPUs 26 may be provided, each associated with one of the security domains, so that different memory access permissions can be specified for a given region of memory depending on whether the current domain is the secure domain or the less secure domain (e.g. a region could be read only in the less secure domain but both readable and writable in the secure domain).

Figure 2:
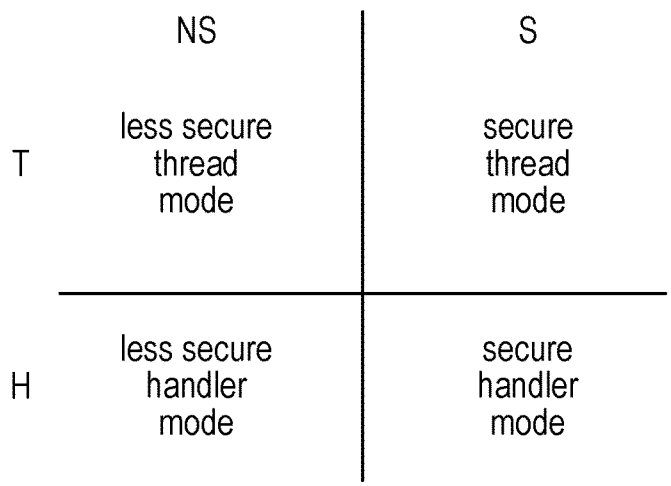
FIG. 2 shows an example of different domains and modes of operation of the processing circuitry.

Hence, as shown in FIG. 2, the processing circuitry 4 may support performing data processing in one of a number of security domains including at least a secure domain (S) and a less secure domain (NS). Although FIG. 2 shows a system with only two security domains, it would be possible to provide three or more domains associated with different levels of security.

Also, within a given security domain, as shown in FIG. 2 the processing circuitry may perform data processing in one of a number of modes, including a handler mode (H) for exception processing and a thread mode (T) for background processing. Exception control circuitry 28 may be provided to control exception handling operations, including exception entry transitions and exception return transitions, and any saving/restoring of architectural state during such transitions. The separation of exception handling into a dedicated handler mode H can be useful to simplify management of which registers are allowed to be accessed by the processing circuitry (e.g. some registers used for exception handling may be accessible in the handler mode H but may not be accessible in the thread mode T). In general, when operating in the handler mode H then the processing circuitry 4 may by default be assumed to have a more privileged mode of operation so that access to memory is controlled according to a certain level of privilege level other than the least privileged level, while in the thread mode T the processing circuitry may have one of a number of different privilege levels depending on other architectural state stored in the control registers 20.

Hence as shown in FIG. 2, the combination of the security domain and the mode in which the processing circuitry 4 is operating may determine aspects of how processing is carried out by the processing circuitry 4. FIG. 2 shows four different combinations of these modes, including:
  secure thread mode (shorthand for the combination of the secure domain and the thread mode)
  less secure thread mode (combination of the less secure domain and the thread mode)
  secure handler mode (combination of the secure domain and the handler mode) and
  less secure handler mode (combination of the less secure domain and the handler mode).
As discussed below, in response to exception conditions, and exception return conditions, the actions carried out may depend on the particular transition being made between these respective combinations of security domain and mode.

Figure 3:
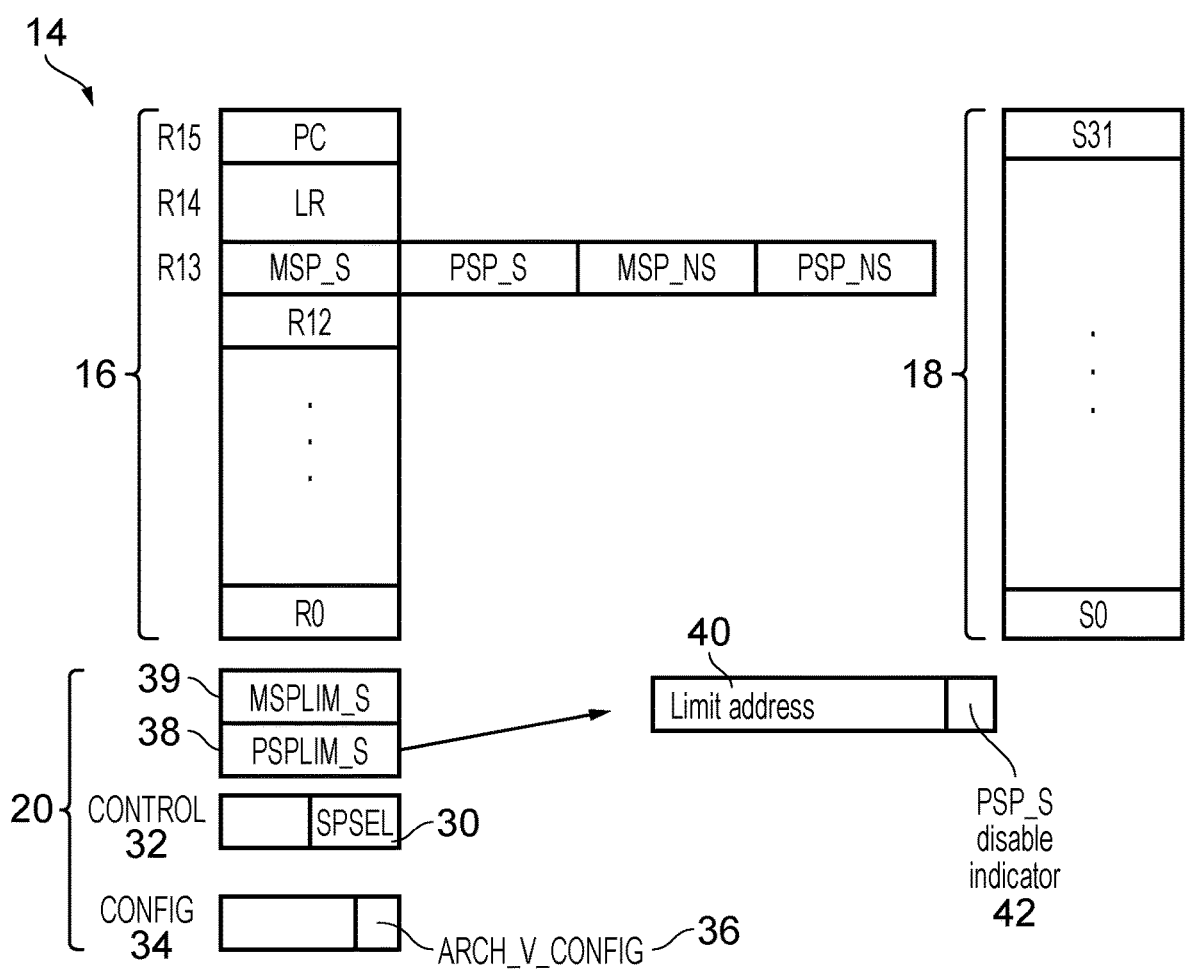
FIG. 3 shows an example of registers of the processing circuitry.

FIG. 3 shows some of the registers 14 of the processing system. It will be appreciated that this representation does not show all of the possible registers which may be provided, and many other registers may also be provided. As shown in FIG. 3, the registers 14 include the general purpose registers 16, the floating point registers 18, and a number of control registers 20 (only some of the control registers are shown in FIG. 3—others can also be provided). In this example there are 16 general purpose registers provided, labeled R0 to R15, and 32 floating point registers, labeled S0 to S31.

Among the general purpose registers R0 to R15, registers R0 to R12 are used for storing general purpose operands, such as the input operands for arithmetic or logical instructions or the operands used to derive addresses for load/store instructions for accessing the memory system 6. It may be possible to use the general purpose registers R13 to R15 for such general purpose operands, but they also serve other control functions.

Register R15 is used as a program counter (PC) register which stores a program counter which provides an indication of the current point of the program reached by the processing circuitry 4. The program counter register can be used by the fetch stage 8 to determine which instructions to fetch from the memory system.

Register R14 is used as a link register (LR) which is used for storing function return addresses when a function is called so that when the processing associated with the function is complete then the address in the link register can be used to redirect the program flow back to the next instruction after the function calling instruction. Also the link register can be used on occurrence of an exception to store an exception return value which provides information for controlling unstacking of architectural state when the corresponding exception return condition is encountered. This will be discussed in more detail below.

Register R13 is used as a stack pointer register which provides a stack pointer indicating an address of a stack data structure in memory. The stack data structure can be used for saving architectural state when an exception condition occurs and for restoring architectural state when an exception return condition occurs. As shown in FIG. 3, register R13 is banked so that a number of different physical registers are provided in hardware, each accessible using the register specifier R13, with the particular banked register that is selected when R13 is specified depending on the current security domain and mode of the processing circuitry.

For example the banked stack pointer registers may include a secure main stack pointer register (MSP_S), a secure process stack pointer register (PSP_S), a less secure main stack pointer register (MSP_NS) and a less secure process stack pointer register (PSP_NS). In general the secure stack pointer registers MSP_S and PSP_S are accessible to the processing circuitry 4 when in the secure domain S but are inaccessible when in the less secure domain NS. The less secure stack pointer register MSP_NS and PSP_NS are accessible in both the less secure and secure domains. In general, the process stack pointers PSP_S or PSP_NS are expected to be used within thread mode T, and the main stack pointers MSP_S or MSP_NS are expected to be used within handler mode H. The provision of separate main and process stacks for handler mode and thread mode respective can make development of exception handler code simpler, as it means that any data which exception handlers may leave on the main stacks is not generally accessible to the thread running in thread mode after exception return. This can simplify development of exception handler code as the exception handler does not need to include instructions for clearing all of its data from the main stack data structure. However, as will be discussed in more detail below, it is possible for some processes in thread mode T to use the main stack pointer, with a stack pointer selection value 30 stored in a control register 32 controlling whether the main stack pointer or the process stack pointer should be used when in thread mode T. Hence, which stack pointer should be used may be determined based not only on the combination of the current mode (thread or handler) and current domain (secure or less secure) but also on the stack pointer selection value 30.

In general, within the body of an exception handler operating in handler mode H or the thread operating in thread mode T, the choice of secure or non-secure stack pointer may depend on the current security domain in which the processing circuitry 4 is executing code. For exception entry and return, the stacking and unstacking of state is performed from the stack identified by the stack pointer which is associated with the security domain of the background code which was running before the exception occurred.

As shown in FIG. 3, the control registers 20 may include a configuration register 34 which may store configuration data including an architecture configuration indicator 36 which may specify whether the processing circuitry should operate according to a legacy instruction set architecture or to a newer version of the instruction set architecture. As discussed below, this may influence the response of the processing circuitry to exception entry conditions.

Also the control registers 20 may include one or more secure stack pointer limit registers 38, 39 which are used to specify a limit address 40 which provides a limit to the extent to which the secure stack data structures pointed to by the secure stack pointers MSP_S and PSP_S can grow. In this example there are two limit registers, one 39 for the secure main stack pointer MSP_S and one 38 for the secure process stack pointer PSP_S. A limit address within each limit register can be used to limit how far the stack data structure can extend. 40 shows how the limit address for the PSPLIM_S register 38 is arranged. If the processing circuitry or the exception control circuitry 28 detects that the main or process secure stack data structure has extended beyond the limit address in the corresponding limit register 38, 39 (or detects an attempt to update the stack pointer to a value beyond the limit address), then the exception control circuitry 28 may trigger a fault to be signaled which may itself trigger an exception and then an exception handler may respond to the fault by taking some recovery action or other measure to ensure security. This can be useful to ensure that an attacker cannot break security measures by causing so many exceptions, or by calling so many functions, so that the stack data structure extends into a region used for other data which could corrupt that data in those other regions.

As shown in FIG. 3, for the secure process stack pointer limit register 38, the register may, in addition to the limit address 40, also specify a secure process stack pointer disable indicator 42 which can be used to temporarily disable access to the secure process stack pointer register PSP_S. Such a disable indicator may not be included in the main stack limit register 39. The secure process stack pointer disable indicator 42 is an example of a transition disable indicator which may be used to disable some exception return transitions to improve security as will be discussed below.

One aspect of handling exception entry and return is the stacking and unstacking of architectural state. When an exception condition occurs, some of the architectural state stored in the registers 14 may need to be saved to memory so that even if the exception handler executed after the exception has been entered overwrites those registers, the previous contents of the registers can subsequently be restored from memory when it is desired to return to the processing being performed before the exception occurred. The stack data structure pointed to by one of the banked stack pointer registers shown in FIG. 3 can be used to save this state.

For performance reasons, it can be useful to divide the registers which may need to be saved in response to such exception entry events into two groups, referred to as the "caller" registers and the "callee" registers. The caller registers are the registers for which the exception control circuitry 28 implemented in hardware has responsibility for saving to the stack. Hence, there is no need for software of the exception handler to include instructions for saving the caller registers to the stack data structure.

Figure 4:
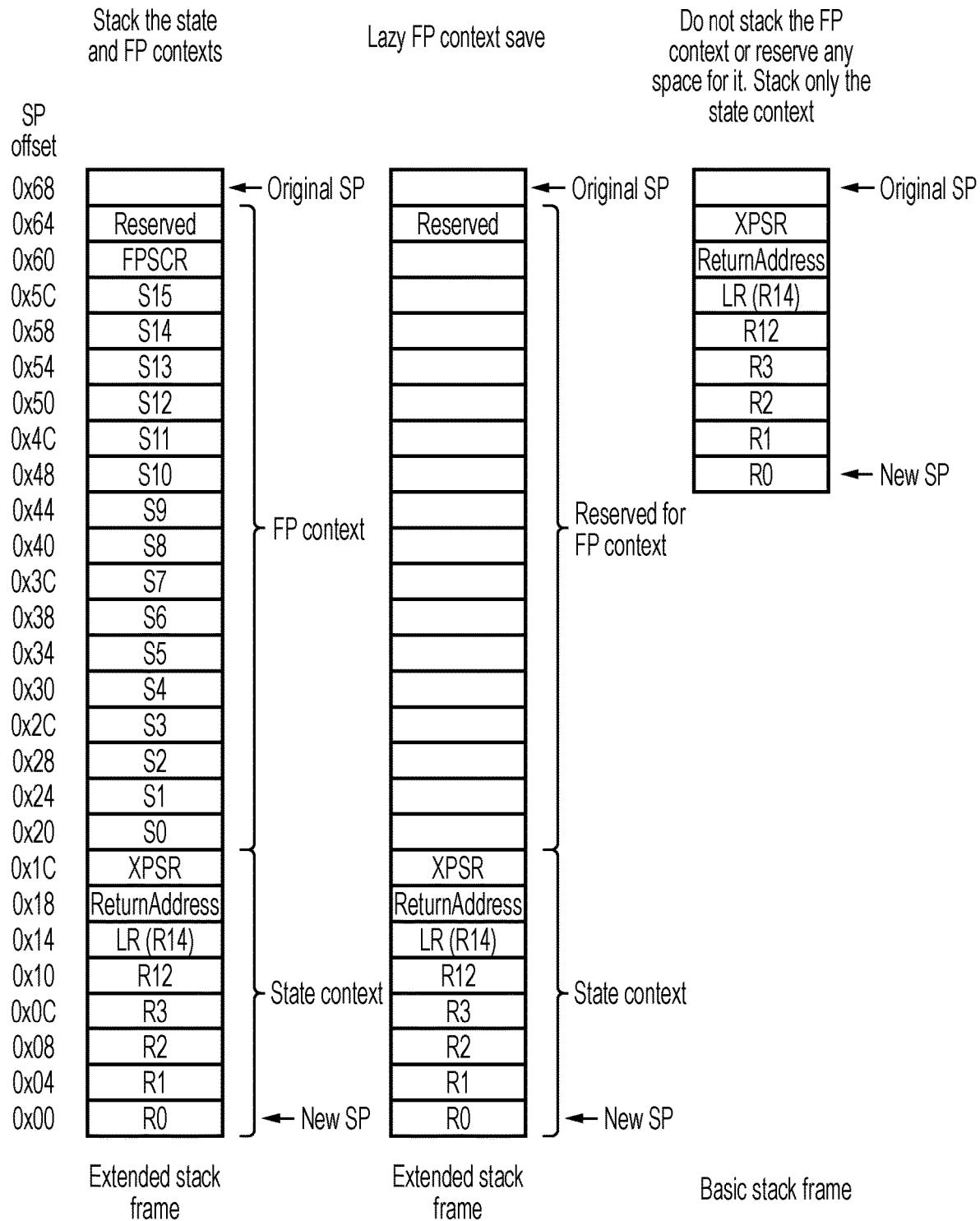
FIG. 4 shows a number of examples of a first exception stack frame which omits architectural state associated with callee registers, and omits an integrity signature.

As shown in FIG. 4, the caller registers may include a subset of the general purpose registers. In this example, the caller state includes general purpose registers R0, R1, R2, R3 and R12, the link register LR (R14), an indication of the return address to which processing is to be returned after processing of the exception, and a program status register XPSR which may provide condition codes for controlling outcomes of conditional instructions. It will be appreciated that this is just one particular example of which register state could be included in the caller registers.

As shown in the basic stack frame in the right hand part of FIG. 4, for processes which do not use any of the floating point registers 18, the basic stack frame may only include certain integer registers 16 or control registers 20 and the return address. However, if the process executing before the exception also uses the floating point registers 18, then as shown in the extended stack frame on the left hand side of FIG. 4, the caller registers may also include a subset S0-S15 of the floating point registers 18. The floating point context could also include additional control registers such as a floating point state control register FPSCR which is used to control processing of floating point operations.

As shown in the middle part of FIG. 4, it is also possible for the extended floating point stack frame to include space reserved for the additional floating point context, but to not actually have the floating point context saved to this reserved space on the stack at the time of handling the exception entry. Instead, lazy floating point context saving could be used, where in response to the exception the space is reserved on the stack so that the new stack pointer generated following the exception entry is predictable, but the actual saving of floating point context to this reserved space is deferred until the first time floating point state is needed following the exception. In this way, if a subsequent exception return occurs before any floating point context has been accessed by the exception handler, the time and energy expended in saving the floating point context from the floating point registers 18 to memory can be avoided.

Hence, all of the example stack frames shown in FIG. 4 are an example of a caller register stack frame (first stack frame) which includes state saved from the caller registers but does not include state associated with the callee registers.

After the caller stack frame has been saved to the stack by the exception control circuitry 28 in response to the exception event, the execution of the exception handling code may start, and then the exception handler software may save state from additional callee registers onto the stack, if it knows it will be overwriting this state during its execution. However, this state saving by the exception handler is performed by controlling a load/store unit of the processing circuitry 4 to save the relevant data off to memory in response to load/store instructions provided in the exception handler code, which may be slower than if the exception control circuitry 28 controlled the stacking in hardware. However, it can be beneficial to allow a partition between the caller and callee register state, so that the software executing after the exception has been entered can influence which registers are needed to be saved. If the exception handler will never access a particular callee register (general purpose register R7 or floating point register S27, for example) then the exception handler does not need to save the corresponding architectural state and the energy and time associated with having done this state saving in exception control circuitry 28 and hardware has also been avoided. Writers of code for exception handlers, or compilers of such code, could be encouraged to first use the caller registers before using the additional callee registers, to reduce the chance that additional state saving in software is needed.

However, if the exception entry causes a transition from the secure domain to the less secure domain and the original background processing being performed in thread mode before the exception was in the secure domain, then if only the caller registers are saved to memory by the exception control circuitry 28 this may leave the callee registers accessible within the register bank 14 to the less secure exception handler to be executed after the latest exception. This may be undesirable as the callee registers could include information derived from secure regions of the memory address space which the SAU 24 would otherwise prevent the less secure exception handler accessing.

Therefore, for certain transitions from the secure domain to the less secure domain where background processing was previously performed in the secure domain, the exception control circuitry 28 may, in addition to saving of the caller registers, also save the callee registers to the relevant stack data structure and may clear contents of the registers that have been saved (including caller and callee registers). Hence by performing additional state saving in hardware, this means that the software which would normally save the callee registers cannot gain access to potentially secure information stored in these registers before the exception occurred.

Figure 5:
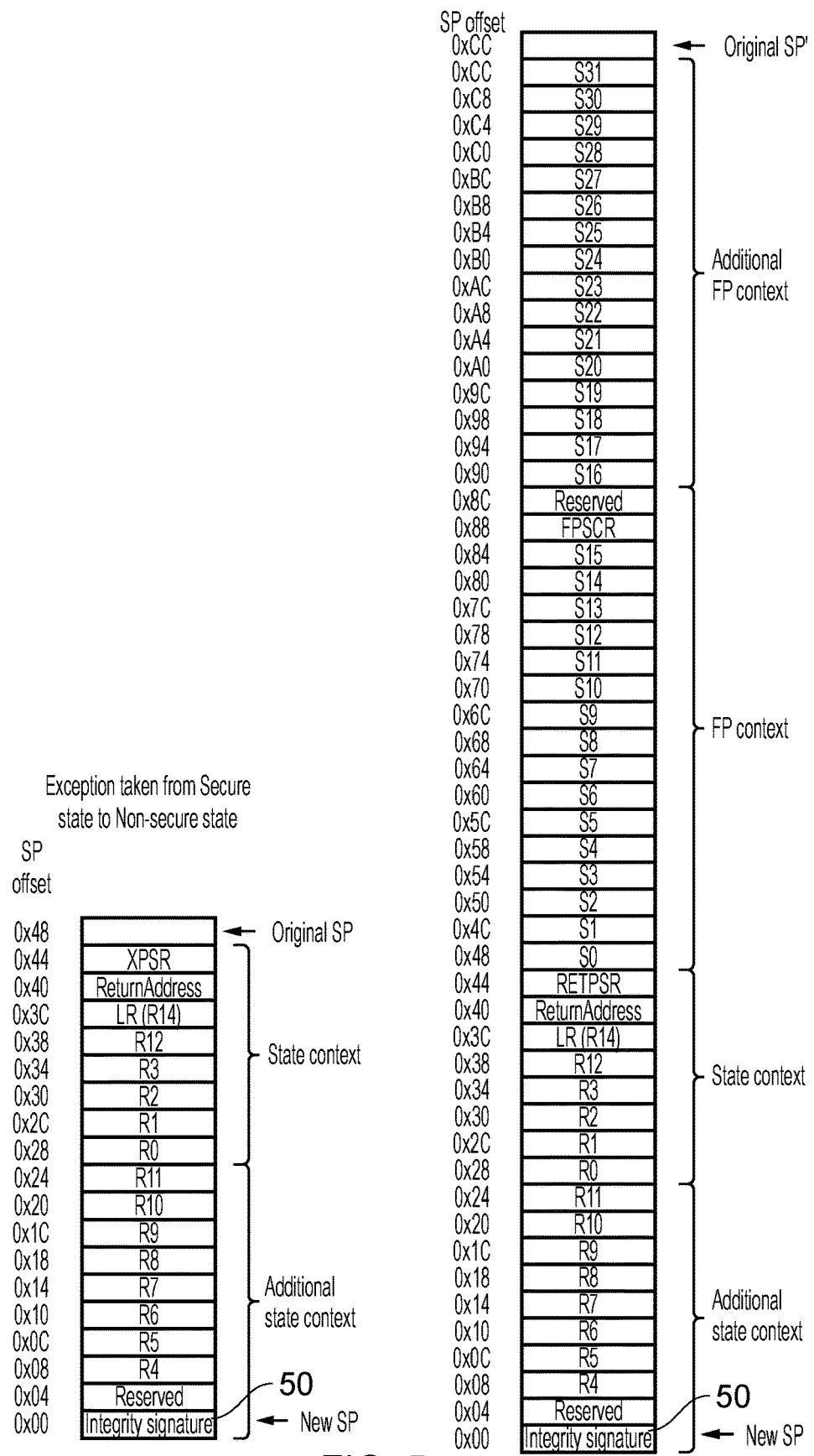
FIG. 5 shows an example of a second exception stack frame which includes additional architectural state from the callee registers and includes the integrity signature.

Hence, for certain exception entry transitions, instead of storing the caller stack frame shown in FIG. 4, instead a second stack frame as shown in FIG. 5 may be saved (under hardware control by the exception control circuitry 28, i.e. without needing explicit load/store instructions to be executed by the processing circuitry 4). Again, as shown in the left hand part of FIG. 5, for cases where no floating point context is needed then the stack frame may omit saving of any floating point state. In this case, the second stack frame includes both the caller state shown in FIG. 4 and also the additional callee state including registers R4-R11. The additional state saved by the hardware may also include an integrity signature 50 which will be described in more detail below. Alternatively, for cases where the floating point context also needs to be saved, then in addition to the caller state shown in the left hand example of FIG. 4, the extended second stack frame also includes the additional callee floating point registers S16 to S31, as shown in the right hand side of FIG. 5. Although not shown in FIG. 5 some embodiments may reserve the space for callee and caller floating point registers, and lazily save those registers in the same way as described for FIG. 4.

Hence, the basic caller stack frames shown in the examples of FIG. 4 may be an example of a first exception stack frame, and the stack frame examples of FIG. 5 which also include additional architectural state associated with the callee registers may be an example of the second exception stack frame which includes a subset of architectural state data from the registers that is omitted from the first exception stack frame. On exception entry transitions the exception control circuitry may select which of the first and second exception stack frames should be saved by the hardware, for example depending on the security domains associated with the processing performed before and after the exception or on other state information associated with the control registers 20. Whether the floating point context is saved or not and whether the lazy floating point context saving option is used may depend on control parameters specified in one of the control registers 20.

The integrity signature 50 is included in the second exception stack frame when both caller and callee state is saved by the exception control hardware 28, but is missing from the first exception stack frame shown in FIG. 4. The integrity signature 50 may have a special reserved value which does not correspond to an executable address, for example an address that causes a fault to be signaled if an attempt is made to fetch an instruction from it. This integrity signature can be used to detect certain forms of attack which may be mounted on the processing circuitry to try to circumvent the security protections provided by the hardware enforcing the partitioning between the secure and less secure domains. One possible avenue for attack can be that the attacker attempts to perform an exception entry transition to enter into processing of the exception, but then later fakes a different type of return transition to the one expected to return from the exception entry, such as performing a function return transition. The signature 50 may be located at a position on the stack frame which would be expected to store a function return address if a function return is made, and as the integrity signature 50 may have a special value which does not correspond to an executable address, this means that no valid function return address can match the signature. Hence, if it is detected on a function return that the return address matches the integrity signature 50, a fault can be triggered, as it means that the stack frame being used to perform the function return was actually saved to the stack in response to an exception entry event, which could be an indicator that an attack is being performed. Also, on returning from an exception for which the additional architectural state associated with the callee registers is present on the stack, part of the security checking may be checking whether the value at the relevant offset in the stack corresponding to the integrity signature 50 has the expected value, as the lack of the signature may indicate that an inappropriate sequence of exception entry and return events has been triggered.

Hence, the provision of the integrity signature on the stack is an example of a protective action which may be performed for certain exception entry transitions. In particular this saving of the integrity signature onto the stack may occur for at least one form of secure thread mode to less secure handler mode exception entry transition. However, the integrity signature 50 is not included in the basic caller stack frame as shown in FIG. 4, because when performing exception entries from the secure domain to an exception handler also in the secure domain, it may be expected that the protective measure is not required. Avoiding the callee state (including the integrity signature) in hardware can help to reduce interrupt handling latency for cases when a secure exception occurs during processing of secure background processing in thread mode, and no other exception occurs during processing of the secure exception so that the next exception return simply back to the previous secure background processing.

However, as shown in FIG. 6, the omission of the protective action for the secure thread to less secure handler mode exception entry transition can sometimes provide an avenue which an attacker could exploit. FIG. 6 shows the following sequence of events:

1. An interrupt (IRQ 1) causes a transition to Secure handler mode. The caller saved registers are automatically saved to the secure process stack (indicated by PSP_S) by the exception control hardware 28. To reduce the interrupt handling latency the callee saved registers are not saved, so the first exception stack frame of the type shown in FIG. 4 is saved (omitting the integrity signature). This is acceptable as the target state is Secure so it can be trusted not to corrupt these registers.
2. Another interrupt (IRQ 2) causes a transition to Non-secure handler mode. At this point the hardware preserves both the caller and callee saved registers, as the transition is to the Non-secure state, which cannot be trusted to handle Secure values. Hence, a second exception stack frame of the type shown in FIG. 5 is saved to the secure main stack indicated by MSP_S. The main stack is used as this exception occurred during processing in handler mode.

3. An attacker with control over the non-secure domain could then fake an exception return or function return back to secure thread mode (instead of the expected exception return to secure handler mode to return from IRQ2). As the stack frame saved to the secure process stack at step 1 does not have the integrity signature on its stack, there is a potential for a security breach, if the unstacking on the return to the secure thread mode attempts to unstack the caller-only exception stack frame saved to the secure process stack at step 1.

In a legacy architecture, this issue can be addressed by, at step 1, setting the stack pointer selection value 30 to indicate that the thread mode should subsequently use the main stack pointer (MSP) for unstacking operations, instead of the process stack pointer (PSP) which would normally be used in thread mode. This means that if the attacker fakes the false exception return at step 3, the unstacking will be from the main stack and not the unprotected process stack. Since the stack frame on the main stack is actually for the return of IRQ2 (which is to handler mode) and not for a return to thread mode, other integrity checks may fail (e.g. a mismatch may be detected between the mode actually returned to and the mode indicated in the unstacked state as being the mode intended to be returned to when the stack frame is unstacked). Hence, the attack can be detected.

However, while switching the stack pointer selection value 30 during handling of IRQ1 can avoid the attack, a disadvantage of this approach is that this means that thread mode may sometimes need to use the main stack instead of consistently using the process stack. It can be desirable to allow more consistent usage of the main and process stacks in the handler and thread modes respectively. For example as shown in FIG. 7, there can be a valid use case where following IRQ1 and IRQ2 at steps 1 and 2 (the same as in FIG. 6), execution is depriviliged to library in less secure thread mode via a supervisor call (SVC) exception at step 3, and the less secure library then makes a secure function call to a secure library within the secure domain at step 4. The management of the secure libraries within the secure domain may be much simpler if they can consistently use the process stack when operating in thread mode. In contrast, if the stack pointer selection value 30 is updated as discussed above to mitigate against the attack shown in FIG. 6, then this may require some secure libraries sometimes to use the main stack. This inconsistency in which stack is used can sometimes cause loss of performance or can make software development of the secure libraries more complex.

Another approach for mitigating against the attack discussed above can be to use the transition disable indicator (secure process stack pointer disable indicator) 42 shown in FIG. 3, which can be used to mark the secure process stack pointer PSP_S as unusable. Although in the example of FIG. 3, the transition disable indicator 42 is provided in the secure process stack pointer limit register 38, it could also be placed in other registers such as in unused bits of the secure process stack pointer register PSP_S itself (e.g. using the significant bits which would always be 0 due to address alignment constraints).

In response to at least one exception entry transition from the secure thread mode to the secure handler mode, the exception control circuitry 28 may set the secure stack pointer disable indicator 42 to a predetermined value (e.g. 1). For at least one type of exception return transition to processing in the secure domain and the thread mode when the transition disable indicator is set to the predetermined value, the exception control circuitry may trigger the signaling of a fault. Hence, with the attack example of FIG. 6, the disable indicator 42 could be set in response to IRQ1, and if still set when the exception return or function return from less secure handler mode to secure thread mode is made at step 3, this may trigger a fault, to prevent an attacker exploiting the mismatch between the stack frame expected for a transition from less secure handler mode to secure thread mode and the stack frame actually saved on the secure process stack at step 1.

Hence, a lock bit 42 is added to the architecture which marks the Secure process stack (PSP_S) as unusable. An entry to Secure Thread mode when the process stack would be used by the secure thread mode and the lock bit 42 set raises an exception. This protects against 3 different events an attackers could attempt to exploit the missing integrity signature:

Exception return that would unstack both the caller and callee registers, e.g. an exception return from the less-secure state.

Function returns to secure thread mode from less-secure thread mode

Function calls from less-secure thread mode to secure thread mode.

Alternatively, in some implementations the last option could be relaxed so that function calls from less secure thread mode to secure thread mode may be permitted to enable the use case in FIG. 7.

To support continued correct functioning of legacy code designed for the architecture in which the stack pointer selection flag 30 is updated in response to IRQ1, the architecture configuration indicator 36 may be used to select whether the legacy behaviour (of updating the stack pointer selection flag 30 in response to IRQ1), or the newer behaviour (of setting the secure process stack pointer disable indicator 42) should be used in the secure thread mode to secure handler mode transition.

FIG. 8 is a table showing a number of different forms of exception entry transition which may be supported by the exception control circuitry. As shown in the first four columns of the table, which exception entry transition is selected depends on the security domain and mode associated with the background processing being performed before the exception entry occurs, whether the background processing was using the main stack pointer or the process stack pointer as indicated by the stack pointer selection value 30 for thread mode, and on the security domain associated with the exception condition itself. For example, the type of exception which has occurred may imply whether it is a secure or less secure exception, or the exception may be associated with additional control information which specifies which security domain is associated with the exception. Note that there are no transitions which correspond to the background processing performed in the handler mode which use the process stack pointer, because the process stack pointer can only be used if the background mode is thread mode. Hence there are no equivalents of row 9 to 12 of the table for the cases when the background mode is the handler mode.

The fifth and sixth columns of the table of FIG. 8 illustrate, for each of the different exception entry transitions, which stack frame format is used and whether any changes should be made to the secure process stack pointer disable indicator 42.

For the transitions indicated in rows 5 to 8, 11 and 12, only the caller saved registers need to be saved, because the background processing being performed was in the less secure domain and so there is no risk of loss of sensitive information if the callee registers are not saved.

For the transitions shown in rows 2, 4 and 10, the background processing was in the secure domain and the target security domain for the exception is the less secure domain and so the additional state saving of the callee saved registers is performed by the exception control circuitry 28 in hardware to prevent data in these registers being leaked to the less secure exception handler.

For the transitions shown in rows 1, 3 and 9 of FIG. 8, while the architecture may only require that the caller registers are saved, it may permit the callee registers optionally to be saved as well if desired. This could be useful because if the system is first performing a type of exception entry transition which requires saving of both the caller and callee saved registers, but then while saving the callee registers a higher priority exception occurs and so instead a different exception entry is selected which did not require the callee registers to be saved, it may be simpler for the hardware to continue saving the callee registers rather than halting the saving and having to undo the changes associated with the previous saving of callee registers that had already taken place in response to the first exception. The exception return value which is written to the link register R14 may include a flag DCRS which may be set to indicate whether the default stacking rules have been followed and only the caller registers are on the stack, or whether the callee registers have also been placed on the stack. This flag can be checked when performing an exception return to determine what unstacking needs to be performed and also may be used to determine what integrity checks should be performed based on the integrity signature. This exception return value which is placed in the link register could also specify other information for reference during exception return, such as whether the secure or less secure stack was used for stacking, a flag indicating the mode of operation from which the stacking was performed (and to which the corresponding exception return is expected), or a flag indicating whether the stack frame is a standard integer only stack frame or is an extended floating point stack frame. It will appreciated that other information can also be indicated in the exception return value.

As shown in the right hand column of FIG. 8, for most of the exception entry transitions no change to the disable indicator 42 is made. However, for the transition shown in row 9, which is a transition to a secure exception in handler mode from secure background code in thread mode which uses the process stack pointer, then if only the caller registers are saved and not the callee registers, the disable indicator 42 is set. For the reasons discussed above it is possible that on this transition sometimes callee registers may also be saved and if this is the case then the disable indicator 42 does not need to be set. For example, the transition shown in row 9 may correspond to the interrupt IRQ1 shown in FIG. 6. By setting the disable indicator 42 this disables some forms of exception return transition which can help to improve security to avoid the attack shown in FIG. 6.

FIG. 9 is a table showing a number of different forms of exception return transition which can be used by the exception control circuitry 28 to return processing to previous processing performed before an exception was taken. As shown in the first 5 columns of the table, the particular transition selected depends on the security domain associated with the exception, the security state when the exception return was requested, the stack pointer being returned to, the mode being returned to and the security state being returned to. Which stack pointer, mode and security state is being returned to may be determined based on information associated with the exception return instruction which triggers the exception return event. The security state when the exception return was requested may be different to the security domain associated with the original exception because there could for example have been a function call since the exception was taken which could have resulted in a transition between the less secure and the secure domain. Hence the security domain associated with the exception can also be determined from a flag placed in the exception return value in the link register when the exception was taken. Similar to the exception entry transitions in FIG. 8, for FIG. 9 there are no "return to handler" equivalents of the transitions in rows 5, 6, 11, 12, 17 and 18, because it is not possible to use the process stack pointer in the handler mode. Also there are no exception return transitions returning from a secure exception while currently in the less secure state (i.e. no mirrors of rows 1 to 6 where the security state when the exception return requested is less secure) as these transitions are also prohibited. While a less secure exception can subsequently call a secure function which then triggers an exception return, for a secure exception it is not allowed for the secure exception to then call a less secure function which triggers an exception return.

The sixth column of FIG. 9 illustrates, for each of the exception return transitions, whether the callee registers are expected to be present on the stack frame associated with this exception, and hence whether any integrity signature checking is required to determine whether a value at a particular offset on the stack frame matches the expected integrity signature value. For most of the exception return transitions, either the callee registers are not expected and no integrity signature is checked, or the callee registers are expected and the integrity signature checking is performed. However for the transitions shown in rows 1, 3 and 5 (which correspond to exception entry transitions from rows 1, 3 and 9 of FIG. 8, which may optionally have saved callee registers in addition to caller registers), whether or not the callee registers are expected and the integrity signature is to be checked may depend on the DCRS flag which was saved in the exception return value in the link register when the exception was taken.

The final column of FIG. 9 illustrates whether for the corresponding exception return transition, there is any need to signal a fault if the secure process stack pointer disable indicator 42 is set, and whether the disable indicator is cleared if it was already set. The secure process stack pointer disable indicator 42 may be cleared for exception return transition 5 where the return is from a secure exception, the security domain is secure when the exception return is requested, the stack pointer being returned to is the secure process stack pointer and the security domain and mode being returned to is secure thread mode. This would correspond to the return which would occur if, following IRQ1 of FIG. 6, the corresponding exception return was performed without any intervening exception IRQ2. This is the expected behaviour and so once the expected return back to secure thread mode has occurred then there is no longer any need to keep the disable indicator 42 set, and so this may be cleared to reduce the likelihood of fault in the future.

However, for transitions 11 and 17 shown in FIG. 9, if the disable indicator 42 is set when these transitions are attempted then a fault may be raised. This is because for these transitions there is a risk that following a sequence of exceptions such as the one shown in FIG. 6, the stack frame that would be read from the process stack pointer may not include the integrity signature and so this could risk loss of security.

The exception return transitions 11 and 17 shown in FIG. 9 are not the only events which may cause a fault to be signaled if the transition disable indicator 42 is set. When the transition disable indicator is set the exception control circuitry could also trigger signaling of the fault in response to any of the following events: a function call or function return from processing in the less secure domain to processing in the secure domain and the thread mode;

processing of any instruction in the secure domain and the thread mode; a secure gateway data processing instruction that indicates a valid entry point to the secure domain, which is processed in the thread mode and associated with a transition from the less secure domain to the secure domain; and a first access, following a transition to a combination of the secure domain and the thread mode, to a secure process stack pointer accessible to the processing circuitry when in a combination of the secure domain and the thread mode.

Figure 10:
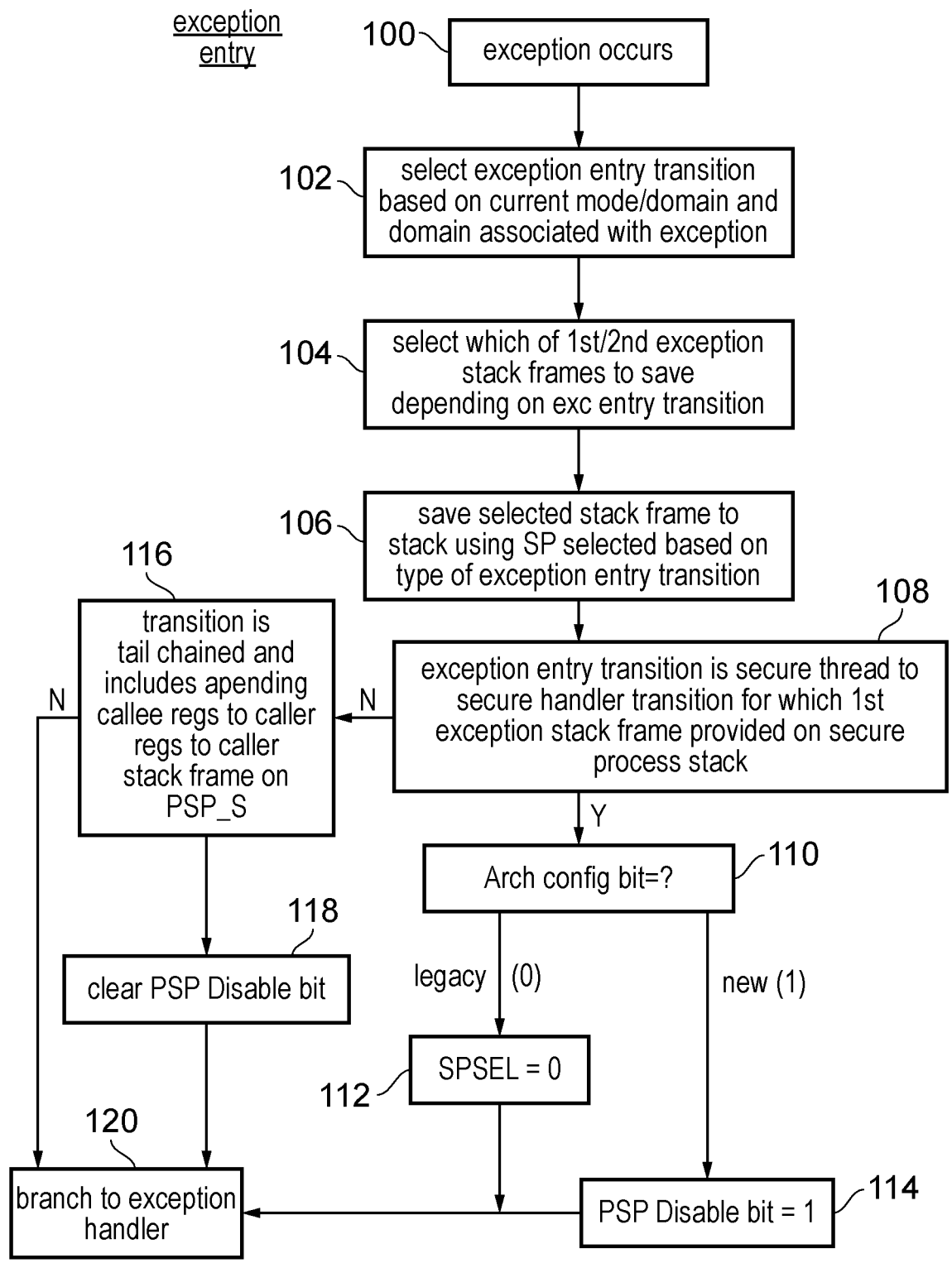
FIG. 10 is a flow diagram illustrating a method of handling an exception entry transition.

FIG. 10 is a flow diagram illustrating a method of handling exception entry transitions using the exception control circuitry 28. At step 100 the exception condition occurs. For example, the exception condition can be triggered by receipt of an interrupt signal from a hardware device or by execution of a software instruction for triggering an exception. At step 102 the exception control circuitry selects the particular exception entry transition to be performed, based on the current mode and domain of the processing circuitry 4 and a security domain associated with the exception which occurred at step 100. At step 104 the exception control circuitry 28 selects whether to save the first exception stack frame (which includes caller registers only) or the second exception stack frame (which also includes the callee registers and the integrity signature). Which one of the first and second exception stack frames is selected depends on the particular exception entry transition as shown in FIG. 8 and could also depend on past events, such as whether the exception is tail-chained onto handling of an earlier exception which may have already saved some of the registers of the second exception stack frame, in which case for some exception entry transitions it is possible to continue saving these even if not required for the particular exception entry transition, as discussed above for FIG. 8.

At step 106 the selected exception stack frame is saved to one of the stack data structures in memory that is pointed to by a selected one of the stack pointers in the banked stack pointer registers R13 of FIG. 3. The selected stack pointer is the stack pointer that was being used by the background code being executed prior to the exception occurring. If the background code is processed in secure handler mode, the secure main stack pointer is used as the selected stack pointer. If the background code is processed in secure thread mode, either the secure process stack pointer or the secure main stack pointer is used (depending on the stack pointer selection value 30). If the background code is processed in less secure handler mode, the less secure main stack pointer is used. If the background code is processed in less secure thread mode, either the less secure process stack pointer or the less secure main stack pointer is used (depending on the stack pointer selection value) 30.

At step 108 the exception control circuitry determines whether the exception entry transition is a secure thread to secure handler transition, and the first stack frame format was selected at step 104, and the secure process stack pointer was selected at step 106. For example, this may be the transition shown in row 9 of FIG. 8. If the exception entry transition is the secure thread to secure handler transition then at step 110, and the first stack frame format was selected at step 104, and the secure process stack pointer was selected at step 106, the exception control circuitry detects whether the architecture configuration indicator 36 in the configuration register 34 is set to 1 or 0. If the architecture configuration indicator is 0 then this means that the system is operating according to a legacy architecture and so at step 112 the stack pointer selection value 30 is set to 0 to indicate that the main stack pointer should be used for subsequent unstacking operations when returning to secure thread mode. This helps to address the type of attack shown in FIG. 6 because if subsequently the exception return shown at step 3 of FIG. 6 is made through an unexpected route, then the fact that unstacking is performed from the main stack instead of the process stack would result in failure of other integrity checks due to mismatches in the mode being returned to and the mode indicated in the stack frame unstacked from the main stack.

However, if at step 110 it is determined that the architecture configuration bit 36 is set to 1 to indicate that the new behaviour of the architecture is to be followed, then at step 114 the exception control circuitry 28 sets the secure process stack pointer disable indicator 42 to 1. The stack pointer selection value in this case can remain at 1 to avoid needing to change which stack is used by subsequent processing in the thread mode. The setting of the secure process stack disable indicator 42 ensures that the inappropriate sequence of exception entries and return shown in FIG. 6 can still be detected as will be discussed below for the exception return processing in FIG. 11.

If at step 108 it was determined that the exception entry transition is not the secure thread to secure handler transition, then at step 116 it is determined whether the transition is a tail-chained exception entry transition which includes appending the callee registers to a previously saved caller stack frame on the secure process stack pointed to by the secure stack pointer PSP_S. If the transition is a tail chained exception which results in the additional state associated with the callee registers being added to an existing stack frame on the secure processed stack, then at step 118 the secure process stack disable indicator 42 can be cleared as now that the callee state has been saved then an integrity signature will be present on the stack frame and so there is no longer the risk of the type of attack shown in FIG. 6. However, if the transition is not a tail-chained transition which includes appending callee registers to the caller stack frame on the secure process stack, then step 118 is omitted.

Regardless of the type of entry transition, at step 120 program flow branches to an instruction address associated with the exception handling routine which will perform the exception handling processing required to deal with the exception condition.

Figure 11:
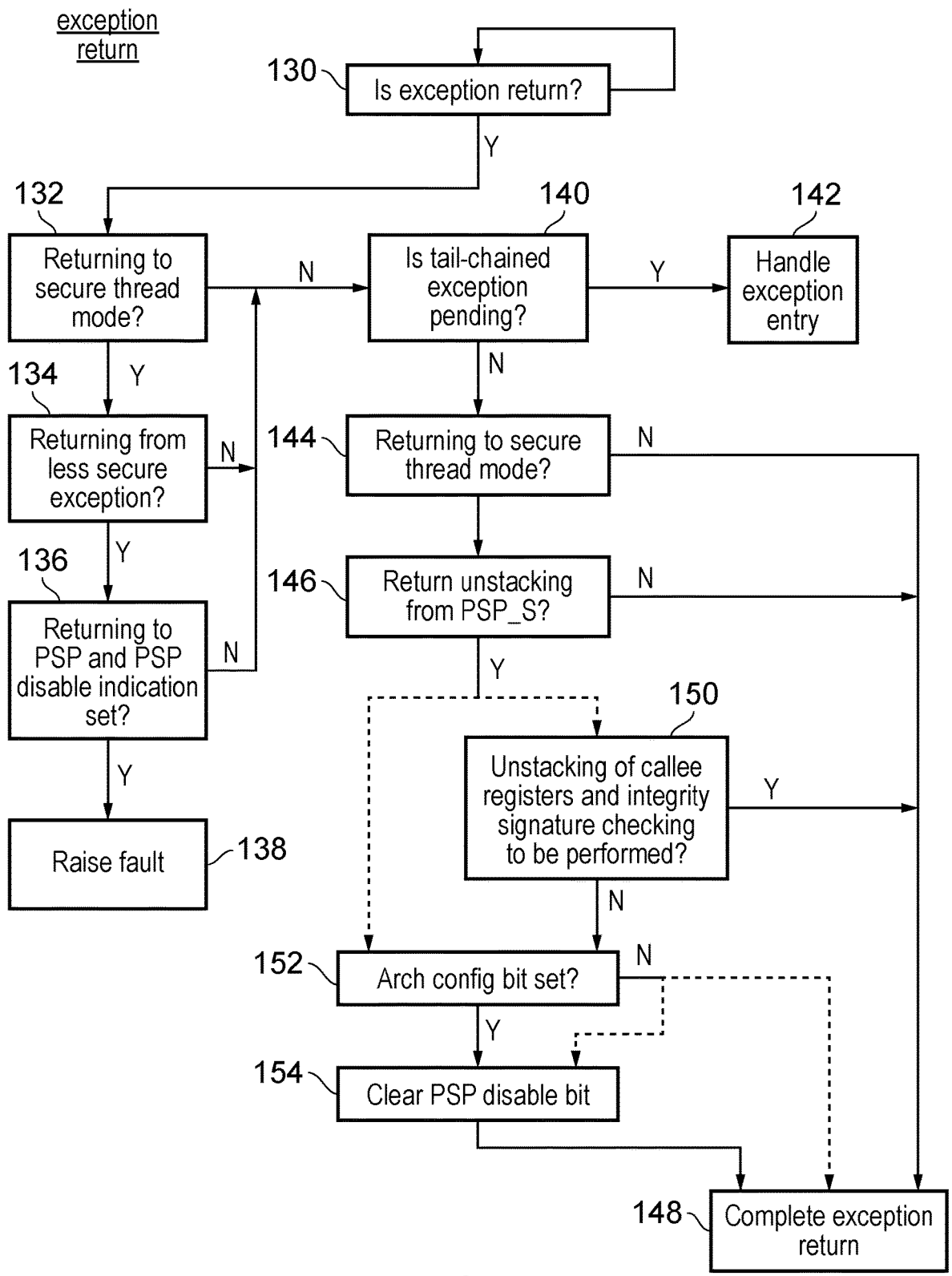
FIG. 11 is a flow diagram illustrating a method of handling an exception return transition.

FIG. 11 is a flow diagram showing the handling of an exception return transition by the exception control circuitry 28. At step 130 the exception control circuitry awaits occurrence of an exception return transition. For example, exception returns can be triggered by execution of an exception return instruction. When an exception return occurs then in steps 132, 134 and 136 the exception control circuitry determines whether this particular exception return transition is (a) returning to the secure thread mode (b) returning from a less secure exception, and (c) returning to use of the process stack pointer when the secure process stack pointer disable indication 42 has been set to 1. If all three conditions are satisfied, then at step 138 a fault is signaled. For example, this may occur for the exception return at step 3 of FIG. 6.

If any of the conditions checked at steps 132, 134 and 136 are not satisfied then at step 140 the exception control circuitry 28 checks whether a tail-chained exception is pending. This could be an exception which occurred while processing the exception return, or could be an exception which had previously been received while processing the exception handler code but which had a lower priority than the previously processed exception (but higher priority than the background processing) so that it did not pre-empt that earlier exception. If a tail-chained exception is pending then at step 142 that exception is taken and the exception entry is handled similar to the method shown in FIG. 10.

If there is no tail-chained exception pending then the exception control circuitry 28 takes steps to return processing to the background processing being performed prior to the current exception. At steps 144 and 146 the exception control circuitry 28 detects whether the exception return is to secure thread mode and whether the exception return transition includes unstacking from the process stack data structure. If either of these conditions is not satisfied then there is no need to clear the secure process stack pointer disable indicator 42 and the method proceeds to step 148 to complete the exception return, including the unstacking of the stack frame, and for some types of exception return transition as shown in the table of FIG. 9, including integrity signature checking.

If the exception return transition is to secure thread mode and includes unstacking from the process stack pointer then there are a number of options for how the system could proceed. The dotted lines in FIG. 11 show a number of alternate actions that could be taken. In one example, at step 150 the exception control circuitry 28 determines whether unstacking of callee registers and integrity signature checking is to be performed for this exception return transition, and if so then there is no clearing of the disable indicator 42 and the method proceeds straight to step 148. If no unstacking of callee registers and integrity signature checking is required then at step 152 it is checked whether the architecture configuration bit 36 has been set to 1 to indicate the non-legacy architecture behaviour, and if so then at step 154 the secure processed stack pointer disable indicator 42 is cleared. The method then proceeds to step 148 to complete the exception return. Hence, on an exception return transition which returns to secure thread mode, includes unstacking from the secure process stack, but does not involve unstacking of callee registers and integrity signature checking, the disable indicator 42 can be cleared because in this case this would indicate that following an exception IRQ1 at step 1 of FIG. 6, processing simply returned back to the secure thread mode without any intervening exception such as IRQ2 occurring, or that if any further exception such as IRQ2 did occur, the corresponding exception returns were performed correctly (returning from IRQ2 back to secure handler mode and then triggering the return from IRQ1 back to secure thread mode). Hence, in this case the disable indicator 42 can be cleared as the unprotected stack frame on the process stack has been safely unstacked, so the risk of attack is no longer present.

Alternatively, step 152 could be omitted, so that regardless of the current value of the architecture bit, the secure process stack disable indicator 42 is cleared at step 154 if it is determined at step 150 that this is an exception return transition to secure thread mode which includes unstacking from the process stack in the secure side but does not include integrity signature checking. The check of the architecture configuration bit could be omitted because in cases when the legacy architecture is being used, then the disable indicator 42 would never have been set, so clearing the disable indicator 42 effectively just retains its existing value. Therefore the added logic for checking the architecture configuration bit could be omitted to save power and circuit area.

Another option could be that if the architecture configuration bit is not set (indicating the legacy architecture is being used), then the clearing of the disable indicator at step 154 can be omitted, proceeding direct to step 148 following the "N" branch of step 152.

In another option, the checking performed at step 150 could be omitted. Although the exception return transition for which it is desired to clear the disable indicator 42 is the return transition to secure thread mode using the PSP_S when unstacking of callee registers and integrity signature checking is not required, the check of whether integrity signature checking and unstacking of callee registers is required could be omitted as this may be implicit from the fact that no fault was raised at step 138. That is, for a return to secure thread mode using the unstacking from the PSP_S, if checking of the integrity signature and unstacking of callee registers had been required, the PSP_S disable indicator would have been set at step 136, and so a fault would have been triggered. The fact that no fault was triggered can therefore indicate that the answer for step 150 would be "no", so that it is not actually needed to perform step 150 at all.

Hence, by using the disable indicator 42, security can be improved by disabling certain exception return transitions when they could lead to a mismatch in the expected and actual stack frames on the secure process stack.

Figure 12:
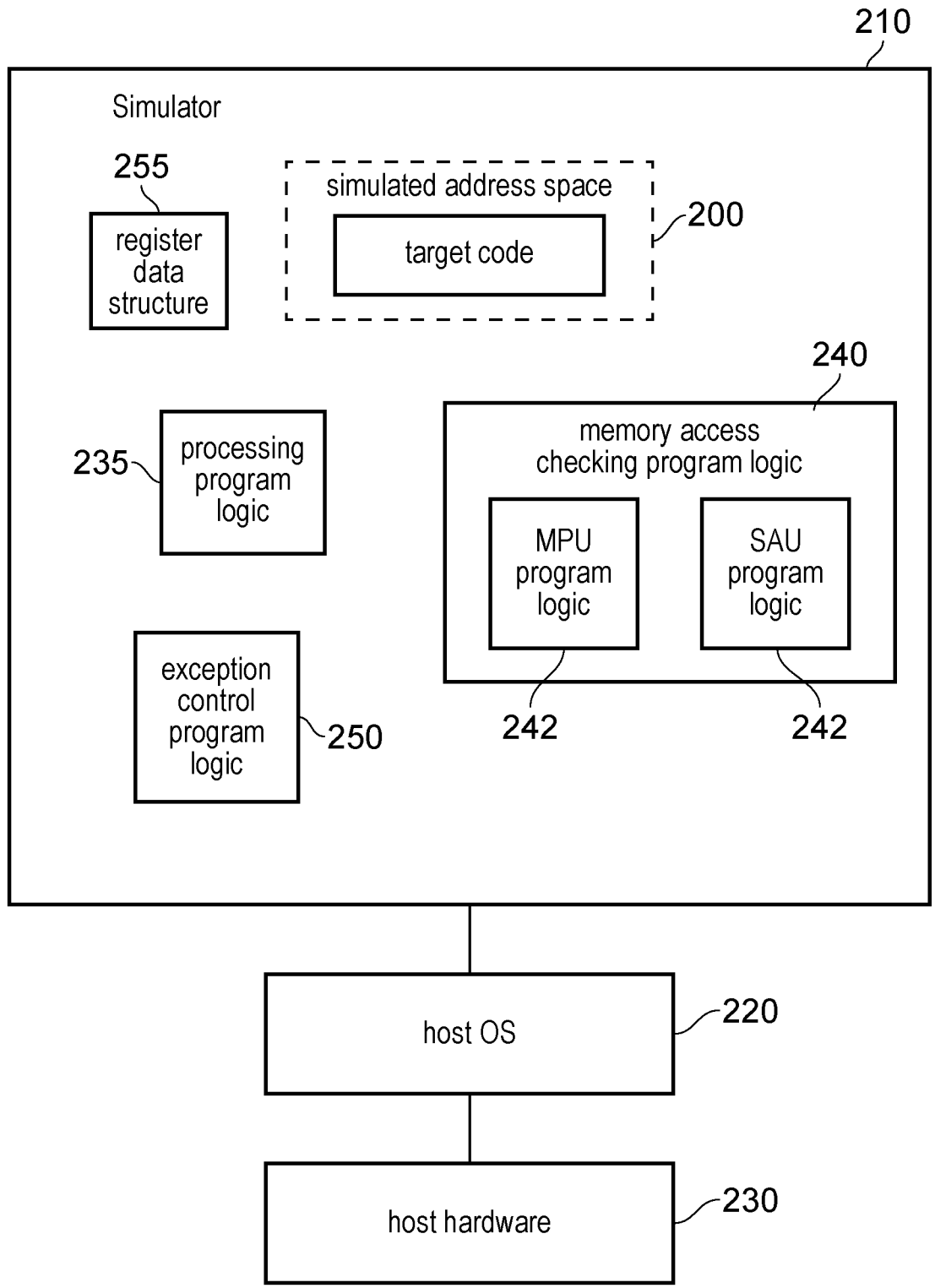
FIG. 12 illustrates a simulator example that can be used.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. Also, the physical address space used to access memory 6 in the hardware apparatus 2 could be emulated as a simulated address space 200 which is mapped onto the virtual address space used by the host operating system 220 by the simulator 210. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code (which may include applications, operating systems and a hypervisor) which is the same as the application program interface of the hardware architecture being modeled by the simulator program 210. Thus, the program instructions of the target code may be executed from within the instruction execution environment using the simulator program 210, so that a host computer 230 which does not actually have the hardware features of the apparatus 2 discussed above can emulate these features. The simulator program may include processing program logic 235, memory access checking program logic 240 (including MPU program logic 242 and SAU program logic 244) and exception control program logic which provide functionality which emulates the behaviour of the processing pipeline 4, memory access checking circuitry 22 (including MPU 26 and SAU 24) and exception control circuitry 28 of the hardware apparatus 2 of FIG. 1. The architectural registers 14 of the system 2 may also be emulated using a register data structure 255 maintained by the simulator code 210. Hence, the exception handling behaviour, including use of the transition disable indicator 42 discussed above, can be performed by simulator program 210 in a corresponding way to the techniques discussed above.

Further example arrangements are set out in the following clauses:

(1) An apparatus comprising:
processing circuitry to perform data processing in one of a plurality of security domains including at least a secure domain and a less secure domain, and within a given security domain, to perform data processing in one of a plurality of modes, including a handler mode for exception processing and a thread mode for background processing;
memory access checking circuitry to check whether a memory access is allowed depending on a current security domain of the processing circuitry;
a plurality of registers to store architectural state data;
at least one stack pointer register to store at least one stack pointer for pointing to a corresponding stack data structure in a memory system, said at least one stack pointer including a secure process stack pointer associated with a secure process stack data structure, said secure process stack pointer accessible to the processing circuitry when in a combination of the secure domain and the thread mode;
exception control circuitry responsive to an exception condition to save at least a subset of architectural state data from the registers to a stack data structure identified by one of said at least one stack pointer, to provide on that stack data structure one of a first exception stack frame and a second exception stack frame, the second exception stack frame comprising a greater amount of architectural state data from the registers than the first exception stack frame; in which:
the exception control circuitry is configured to select which of the first exception stack frame and the second exception stack frame is to be provided on the stack data structure based on which security domain is associated with first processing performed before the exception condition and with second processing to be performed after the exception condition;
in response to an exception condition for which the first exception stack frame is to be provided on the secure process stack identified by the secure process stack pointer, the exception control circuitry is configured to set a secure process stack pointer disable indicator; and
for at least one type of transition to processing in a combination of the secure domain and the thread mode, when the secure process stack pointer disable indicator is set, the exception control circuitry is configured to trigger signaling of a fault.

(2) A data processing method for an apparatus comprising:
processing circuitry capable of performing data processing in one of a plurality of security domains including at least a secure domain and a less secure domain, for which checking of whether memory accesses are allowed is dependent on a current security domain of the processing circuitry, and within a given security domain, the processing circuitry is capable of performing data processing in one of a plurality of modes, including a handler mode for exception processing and a thread mode for background processing;
a plurality of registers to store architectural state data; and
at least one stack pointer register to store at least one stack pointer for pointing to a corresponding stack data structure in a memory system, said at least one stack pointer including a secure process stack pointer associated with a secure process stack data structure, said secure process stack pointer accessible to the processing circuitry when in a combination of the secure domain and the thread mode;
the method comprising:
in response to an exception condition:
selecting one of a first exception stack frame and a second exception stack frame based on which security domain is associated with first processing performed before the exception condition and with second processing to be performed after the exception condition, the second exception stack frame comprising a greater amount of architectural state data from the registers than the first exception stack frame;
saving at least a subset of architectural state data from the registers to a stack data structure identified by one of said at least one stack pointer, to provide on that stack data structure the selected one of the first exception stack frame and the second exception stack frame; and
when the first exception stack frame is to be provided on the secure process stack identified by the secure process stack pointer, setting a secure process stack pointer disable indicator; and
in response to at least one type of transition to processing in a combination of the secure domain and the thread mode, when the secure process stack pointer disable indicator is set, signaling a fault.

(3) A computer program for controlling a host data processing apparatus to provide an instruction execution environment for execution of instructions; the computer program comprising:

processing program logic to support data processing in one of a plurality of security domains including at least a secure domain and a less secure domain, and within a given security domain, to support data processing in one of a plurality of modes, including a handler mode for exception processing and a thread mode for background processing; and memory access checking program logic to check whether a memory access is allowed depending on a current security domain of the processing program logic; in which:

the processing perform logic is configured to support data processing using a register data structure for storing architectural state data, the register data structure comprising at least one stack pointer register to store at least one stack pointer for pointing to a corresponding stack data structure in a memory system, said at least one stack pointer including a secure process stack pointer associated with a secure process stack data structure, said secure process stack pointer accessible to the processing program logic when in a combination of the secure domain and the thread mode;

the computer program comprises exception control program logic responsive to an exception condition to save at least a subset of architectural state data from the register data structure to a stack data structure identified by one of said at least one stack pointer, to provide on that stack data structure one of a first exception stack frame and a second exception stack frame, the second exception stack frame comprising a greater amount of architectural state data from the register data structure than the first exception stack frame;

the exception control program logic is configured to select which of the first exception stack frame and the second exception stack frame is to be provided on the stack data structure based on which security domain is associated with first processing performed before the exception condition and with second processing to be performed after the exception condition;

in response to an exception condition for which the first exception stack frame is to be provided on the secure process stack identified by the secure process stack pointer, the exception control program logic is configured to set a secure process stack pointer disable indicator; and for at least one type of transition to processing in a combination of the secure domain and the thread mode, when the secure process stack pointer disable indicator is set, the exception control program logic is configured to trigger signaling of a fault.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:

processing circuitry to perform data processing in one of a plurality of security domains including at least a secure domain and a less secure domain, and within a given security domain, to perform data processing in one of a plurality of modes, including a handler mode for exception processing and a thread mode for background processing;

memory access checking circuitry to check whether a memory access is allowed depending on a current security domain of the processing circuitry; and exception control circuitry responsive to an exception condition to perform one of a plurality of exception entry transitions selected based on a current mode and the current security domain of the processing circuitry, and a security domain associated with the exception condition, the plurality of exception entry transitions including at least one secure thread mode to secure handler mode exception entry transition; in which:

the exception control circuitry is responsive to an exception return condition to perform one of a plurality of exception return transitions selected based on the mode and security domain associated with the exception return condition;

in response to the at least one secure thread mode to secure handler mode exception entry transition the exception control circuitry is configured to set a transition disable indicator; and for at least one type of exception return transition to processing in the secure domain and the thread mode when the transition disable indicator is set, the exception control circuitry is configured to trigger signalling of a fault.

2. The apparatus according to claim 1, in which the at least one type of exception return transition to processing in the secure domain and the thread mode comprises at least one of:

a transition from processing in the less secure domain and the handler mode to processing in the secure domain and the thread mode; and a transition from processing in the secure domain and the handler mode to processing in the secure domain and the thread mode, when the exception return transition is associated with exception return information specifying that the exception return transition corresponds to a previous exception entry condition to the less secure domain and the handler mode.

3. The apparatus according to claim 1, in which in response to at least one secure thread mode to less secure handler mode exception entry transition, the exception control circuitry is configured to perform at least one protective action which is omitted for said at least one secure thread mode to secure handler mode exception entry transition.

4. The apparatus according to claim 1, comprising at least one stack pointer register to store at least one stack pointer for pointing to a corresponding stack data structure in a memory system, said at least one stack pointer including a secure process stack pointer associated with a secure process stack data structure, said secure process stack pointer accessible to the processing circuitry when in a combination of the secure domain and the thread mode.

5. The apparatus according to claim 4, comprising a plurality of registers to store architectural state data; in which:

the exception control circuitry is responsive to the exception condition to save at least a subset of architectural state data from the registers to a stack data structure identified by one of said at least one stack pointer, to provide on that stack data structure one of a first exception stack frame and a second exception stack frame, the second exception stack frame comprising a subset of architectural state data from the registers that is omitted from the first exception stack frame.

6. The apparatus according to claim 5, in which the second exception stack frame comprises an integrity signature that is omitted from the first exception stack frame; and
for a subset of said plurality of exception return transitions, the exception control circuitry is configured to perform integrity signature checking comprising accessing a stack frame from a given stack data structure selected for that exception return transition, and triggering a fault when a mismatch is detected between the value at a predetermined position in the unstacked stack frame and the integrity signature.

7. The apparatus according to claim 6, in which the exception control circuitry is configured to clear the transition disable indicator in response to an exception return transition to processing in the secure domain and the thread mode for which integrity signature checking is not performed and unstacking is performed using the secure process stack pointer.

8. The apparatus according to claim 6, in which the at least one type of exception return transition to processing in the secure domain and the thread mode comprises an exception return transition for which architectural state is to be restored from the secure process stack data structure and the integrity signature checking is to be performed.

9. The apparatus according to claim 5, in which the at least one secure thread mode to secure handler mode exception entry transition comprises an exception entry transition from the secure domain and the thread mode to the secure domain and the handler mode, for which the first exception stack frame is provided on the secure process stack data structure.

10. The apparatus according to claim 5, in which the exception control circuitry is configured to clear the transition disable indicator when the first exception stack frame stored on the secure process stack data structure is upgraded to provide the second exception stack frame on the secure process stack data structure.

11. The apparatus according to claim 4, in which the transition disable indicator comprises a secure process stack disable indicator which, when set, indicates that access to the secure process stack pointer is disabled.

12. The apparatus according to claim 4, comprising a secure process stack pointer limit register to store a secure process stack pointer limit value, in which:
the exception control circuitry is configured to trigger signalling of a fault in response to detecting one of:
the secure process stack data structure extending beyond the secure process stack pointer limit value; and
an attempt to adjust the secure process stack pointer register to a value beyond the secure process stack pointer limit value; in which:
the transition disable indicator is stored in the secure process stack pointer limit register.

13. The apparatus according to claim 4, wherein the transition disable indicator is stored in the secure process stack pointer register.

14. The apparatus according to claim 1, comprising a configuration register to store a configuration indicator, in which the exception control circuitry is configured to set the transition disable indicator in response to the at least one secure thread mode to secure handler mode exception entry transition, when the configuration indicator has a first value.

15. The apparatus according to claim 14, comprising a plurality of stack pointer registers to store a plurality of stack pointers for pointing to a corresponding stack data structures in a memory system, said plurality of stack pointers including:
a secure process stack pointer associated with a secure process stack data structure, the secure process stack pointer accessible to the processing circuitry when in a combination of the secure domain and the thread mode, and
at least one main stack pointer associated with at least one main stack data structure for storing architectural state data saved in response to an exception entry transition from processing in the handler mode; in which:
in response to the at least one secure thread mode to secure handler mode exception entry transition, when the configuration indicator has a second value, the exception control circuitry is configured to trigger saving of architectural state to the secure process stack data structure, and to update a stack selection value to indicate that one of said at least one main stack data structure should be used for unstacking architectural state data in response to a subsequent exception return transition to processing in the thread mode.

16. The apparatus according to claim 1, when the transition disable indicator is set, the exception control circuitry is configured to trigger signalling of a fault in response to at least one of:
a function call from processing in the less secure domain to processing in the secure domain and the thread mode;
a function return from processing in the less secure domain to processing in the secure domain and the thread mode;
processing of any instruction in the secure domain and the thread mode;
a secure gateway data processing instruction that indicates a valid entry point to the secure domain, when processed in the thread mode and associated with a transition from the less secure domain to the secure domain; and
a first access, following a transition to a combination of the secure domain and the thread mode, to a secure process stack pointer accessible to the processing circuitry when in a combination of the secure domain and the thread mode.

17. A data processing method for processing circuitry capable of performing data processing in one of a plurality of security domains including at least a secure domain and a less secure domain, for which checking of whether memory accesses are allowed is dependent on a current security domain of the processing circuitry, and within a given security domain, the processing circuitry is capable of performing data processing in one of a plurality of modes, including a handler mode for exception processing and a thread mode for background processing;
the method comprising:
in response to an exception condition, performing one of a plurality of exception entry transitions selected based on a current mode and a current security domain of the processing circuitry, and a security domain associated with the exception condition, the plurality of exception entry transitions including at least one secure thread mode to secure handler mode exception entry transition; and in response to an exception return condition, performing one of a plurality of exception return transitions selected based on the mode and security domain associated with the exception return condition; in which:

in response to the at least one secure thread mode to secure handler mode exception entry transition, a transition disable indicator is set; and for at least one type of exception return transition to processing in the secure domain and the thread mode when the transition disable indicator is set, a fault is signalled.

18. A non-transitory, computer-readable storage medium storing a computer program for controlling a host data processing apparatus to provide an instruction execution environment for execution of instructions; the computer program comprising:

processing program logic to support data processing in one of a plurality of security domains including at least a secure domain and a less secure domain, and within a given security domain, to support data processing in one of a plurality of modes, including a handler mode for exception processing and a thread mode for background processing;

memory access checking program logic to check whether a memory access is allowed depending on a current security domain of the processing program logic; and exception control program logic responsive to an exception condition to perform one of a plurality of exception entry transitions selected based on a current mode and a current security domain of the processing program logic, and a security domain associated with the exception condition, the plurality of exception entry transitions including at least one secure thread mode to secure handler mode exception entry transition; in which:

the exception control program logic is responsive to an exception return condition to perform one of a plurality of exception return transitions selected based on the mode and security domain associated with the exception return condition;

in response to the at least one secure thread mode to secure handler mode exception entry transition the exception control program logic is configured to set a transition disable indicator; and for at least one type of exception return transition to processing in the secure domain and the thread mode when the transition disable indicator is set, the exception control program logic is configured to trigger signalling of a fault.

* * * * *